United States Patent
Sommerlade et al.

(10) Patent No.: US 11,836,880 B2
(45) Date of Patent: *Dec. 5, 2023

(54) ADJUSTING A DIGITAL REPRESENTATION OF A HEAD REGION

(71) Applicant: RealD Spark, LLC, Beverly Hills, CA (US)

(72) Inventors: Eric Sommerlade, Oxford (GB); Alexandros Neophytou, Oxford (GB)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,964

(22) Filed: Jan. 11, 2022

(65) Prior Publication Data

US 2022/0207847 A1    Jun. 30, 2022

Related U.S. Application Data

(63) Continuation of application No. 16/937,254, filed on Jul. 23, 2020, now Pat. No. 11,232,647, which is a
(Continued)

(51) Int. Cl.
*G06T 19/20* (2011.01)
*G06N 3/045* (2023.01)
(Continued)

(52) U.S. Cl.
CPC ............ *G06T 19/20* (2013.01); *G06N 3/045* (2023.01); *G06N 3/08* (2013.01); *G06T 7/337* (2017.01); *G06T 2207/20081* (2013.01); *G06T 2219/2004* (2013.01); *G06T 2219/2012* (2013.01); *G06T 2219/2021* (2013.01)

(58) Field of Classification Search
None
See application file for complete search history.

(56) References Cited

U.S. PATENT DOCUMENTS 1,128,979 A    2/1915   Hess
1,970,311 A    8/1934   Ives
(Continued)

FOREIGN PATENT DOCUMENTS

CN    1142869 A    2/1997
CN    1377453 A    10/2002
(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
(Continued)

*Primary Examiner* — Jason A Pringle-Parker
(74) *Attorney, Agent, or Firm* — Penny L. Lowry

(57) ABSTRACT

Methods and devices for generating reference data for adjusting a digital representation of a head region, and methods and devices for adjusting the digital representation of a head region are disclosed. In some arrangements, training data are received. A first machine learning algorithm generates first reference data using the training data. A second machine learning algorithm generates second reference data using the same training data and the first reference data generated by the first machine learning algorithm.

28 Claims, 12 Drawing Sheets

Related U.S. Application Data continuation of application No. 16/057,566, filed on Aug. 7, 2018, now Pat. No. 10,740,985.

(60) Provisional application No. 62/543,587, filed on Aug. 10, 2017, provisional application No. 62/542,661, filed on Aug. 8, 2017.

(51) Int. Cl.
  *G06T 7/33* (2017.01)
  *G06N 3/08* (2023.01)

(56) References Cited

U.S. PATENT DOCUMENTS

| | | |
|---|---|---|
| 2,133,121 A | 10/1938 | Stearns |
| 2,247,969 A | 7/1941 | Stewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,499,303 A | 3/1996 | Hundt et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,172,723 B1 | 1/2001 | Inoue et al. |
| 6,199,995 B1 | 3/2001 | Umemoto et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,283,858 B1 | 9/2001 | Hayes, Jr. et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,556,196 B1 | 4/2003 | Blanz et al. |
| 6,654,156 B1 | 11/2003 | Crossland et al. |
| 6,663,254 B2 | 12/2003 | Ohsumi |
| 6,677,980 B1 | 1/2004 | Jeon |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,806,898 B1 | 10/2004 | Toyama et al. |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 6,919,892 B1 | 7/2005 | Cheiky et al. |
| 6,975,755 B1 | 12/2005 | Baumberg |
| 7,001,058 B2 | 2/2006 | Inditsky |
| 7,058,252 B2 | 6/2006 | Woodgate et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,524,053 B2 | 4/2009 | Lipton |
| 7,528,893 B2 | 5/2009 | Schultz et al. |
| 7,545,429 B2 | 6/2009 | Travis |
| 7,614,777 B2 | 11/2009 | Koganezawa et al. |
| 7,697,735 B2 | 4/2010 | Adam et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,698 B2 | 9/2010 | Segawa |
| 7,798,699 B2 | 9/2010 | Laitinen et al. |
| 7,826,668 B1 | 11/2010 | Zaklika et al. |
| 7,864,253 B2 | 1/2011 | Tajiri |
| 8,016,475 B2 | 9/2011 | Travis |
| 8,144,153 B1 | 3/2012 | Sullivan et al. |
| 8,199,152 B2 | 6/2012 | Sullivan et al. |
| 8,223,296 B2 | 7/2012 | Lee et al. |
| 8,331,615 B2 | 12/2012 | Furukawa et al. |
| 8,390,680 B2 | 3/2013 | Perez et al. |
| 8,556,491 B2 | 10/2013 | Lee |
| 8,670,019 B2 | 3/2014 | Byers |
| 8,684,588 B2 | 4/2014 | Ajichi et al. |
| 8,760,762 B1 | 6/2014 | Kelly et al. |
| 8,824,779 B1 | 9/2014 | Smyth |
| 8,908,008 B2 | 12/2014 | Tan et al. |
| 8,926,112 B2 | 1/2015 | Uchiike et al. |
| 8,942,283 B2 | 1/2015 | Pace |
| 8,942,434 B1 | 1/2015 | Karakotsios et al. |
| 9,058,765 B1 | 6/2015 | Mallick et al. |
| 9,104,908 B1 | 8/2015 | Rogers et al. |
| 9,197,884 B2 | 11/2015 | Lee et al. |
| 9,224,060 B1 | 12/2015 | Ramaswamy |
| 9,224,248 B2 | 12/2015 | Ye et al. |
| 9,288,388 B2 | 3/2016 | Son et al. |
| 9,300,916 B1 | 3/2016 | Breedvelt-Schouten et al. |
| 9,325,939 B2 | 4/2016 | Schultz et al. |
| 9,338,449 B2 | 5/2016 | Rojals et al. |
| 9,378,574 B2 | 6/2016 | Kim et al. |
| 9,456,196 B2 | 9/2016 | Kim et al. |
| 9,470,911 B2 | 10/2016 | Fonte et al. |
| 9,489,739 B2 | 11/2016 | Kruglick |
| 9,538,130 B1 | 1/2017 | Ford et al. |
| 9,552,668 B2 | 1/2017 | Yang et al. |
| 9,619,722 B2 | 4/2017 | Takeda et al. |

(56) References Cited

U.S. PATENT DOCUMENTS

| | | |
|---|---|---|
| 9,626,564 B2 | 4/2017 | Rao et al. |
| 9,684,953 B2 | 6/2017 | Kuster et al. |
| 9,710,955 B2 | 7/2017 | Kobayashi et al. |
| 9,740,282 B1 | 8/2017 | McInerny |
| 9,749,581 B2 | 8/2017 | Nilsson et al. |
| 9,824,428 B2 | 11/2017 | Zhang et al. |
| 9,872,007 B2 | 1/2018 | Woodgate et al. |
| 9,986,812 B2 | 6/2018 | Yamanashi et al. |
| 10,043,088 B2 | 8/2018 | Odry et al. |
| 10,067,562 B2 | 9/2018 | Teshome et al. |
| 10,089,740 B2 | 10/2018 | Srikanth et al. |
| 10,169,905 B2 | 1/2019 | Bhat et al. |
| 10,321,747 B2 | 6/2019 | Tamura et al. |
| 10,423,830 B2 | 9/2019 | Chalom et al. |
| 10,664,949 B2 | 5/2020 | Chalom et al. |
| 10,777,018 B2 | 9/2020 | Varady et al. |
| 10,796,480 B2 | 10/2020 | Chen et al. |
| 11,026,634 B2 | 6/2021 | Brouwer et al. |
| 2001/0001566 A1 | 5/2001 | Moseley et al. |
| 2001/0050686 A1 | 12/2001 | Allen |
| 2002/0013691 A1 | 1/2002 | Warnes |
| 2002/0018299 A1 | 2/2002 | Daniell |
| 2002/0113866 A1 | 8/2002 | Taniguchi et al. |
| 2003/0117790 A1 | 6/2003 | Lee et al. |
| 2003/0133191 A1 | 7/2003 | Morita et al. |
| 2003/0137821 A1 | 7/2003 | Gotoh et al. |
| 2003/0197779 A1 | 10/2003 | Zhang et al. |
| 2003/0218672 A1 | 11/2003 | Zhang et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0053274 A1 | 3/2005 | Mayer et al. |
| 2005/0094295 A1 | 5/2005 | Yamashita et al. |
| 2005/0104878 A1 | 5/2005 | Kaye et al. |
| 2005/0110980 A1 | 5/2005 | Maehara et al. |
| 2005/0135116 A1 | 6/2005 | Epstein et al. |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0067573 A1 | 3/2006 | Parr et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0267040 A1 | 11/2006 | Baek et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0019882 A1 | 1/2007 | Tanaka et al. |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0244606 A1 | 10/2007 | Zhang et al. |
| 2007/0279554 A1 | 12/2007 | Kowarz et al. |
| 2007/0279727 A1 | 12/2007 | Gandhi et al. |
| 2008/0043833 A1 | 2/2008 | Perera et al. |
| 2008/0055221 A1 | 3/2008 | Yabuta et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0052796 A1 | 2/2009 | Furukawa et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Miñano et al. |
| 2009/0168459 A1 | 7/2009 | Holman et al. |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0244072 A1 | 10/2009 | Pugach et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |

(56) References Cited

U.S. PATENT DOCUMENTS

| | | |
|---|---|---|
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0063465 A1 | 3/2011 | Nanu et al. |
| 2011/0115997 A1 | 5/2011 | Kim |
| 2011/0154266 A1 | 6/2011 | Friend et al. |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0199460 A1 | 8/2011 | Gallagher |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0286525 A1 | 11/2011 | Kamisli et al. |
| 2011/0292321 A1 | 12/2011 | Travis et al. |
| 2011/0305374 A1 | 12/2011 | Chou |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0105486 A1 | 5/2012 | Lankford et al. |
| 2012/0106193 A1 | 5/2012 | Kim et al. |
| 2012/0114201 A1 | 5/2012 | Luisi et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0223956 A1 | 9/2012 | Saito et al. |
| 2012/0236133 A1 | 9/2012 | Gallagher |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0314145 A1 | 12/2012 | Robinson |
| 2012/0319928 A1 | 12/2012 | Rhodes |
| 2012/0327101 A1 | 12/2012 | Blixt et al. |
| 2012/0327172 A1 | 12/2012 | El-Saban et al. |
| 2013/0070046 A1 | 3/2013 | Wolf et al. |
| 2013/0076853 A1 | 3/2013 | Diao |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0155063 A1 | 6/2013 | Solem et al. |
| 2013/0156265 A1 | 6/2013 | Hennessy |
| 2013/0163659 A1 | 6/2013 | Sites |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0265625 A1 | 10/2013 | Fäcke et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0002586 A1 | 1/2014 | Nourbakhsh |
| 2014/0009508 A1 | 1/2014 | Woodgate et al. |
| 2014/0016354 A1 | 1/2014 | Lee et al. |
| 2014/0016871 A1 | 1/2014 | Son et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0153832 A1 | 6/2014 | Kwatra et al. |
| 2014/0240344 A1 | 8/2014 | Tomono et al. |
| 2014/0240828 A1 | 8/2014 | Robinson et al. |
| 2014/0267584 A1 | 9/2014 | Atzpadin et al. |
| 2014/0340728 A1 | 11/2014 | Taheri |
| 2014/0344718 A1 | 11/2014 | Rapaport et al. |
| 2014/0368602 A1 | 12/2014 | Woodgate et al. |
| 2015/0077526 A1 | 3/2015 | Kim et al. |
| 2015/0116212 A1 | 4/2015 | Freed et al. |
| 2015/0177447 A1 | 6/2015 | Woodgate et al. |
| 2015/0243035 A1 | 8/2015 | Narasimha et al. |
| 2015/0268479 A1 | 9/2015 | Woodgate et al. |
| 2015/0269737 A1 | 9/2015 | Lam et al. |
| 2015/0334365 A1 | 11/2015 | Tsubaki et al. |
| 2015/0339512 A1 | 11/2015 | Son et al. |
| 2016/0125227 A1 | 5/2016 | Soare et al. |
| 2016/0196465 A1 | 7/2016 | Wu et al. |
| 2016/0211001 A1 | 7/2016 | Sun et al. |
| 2016/0219258 A1 | 7/2016 | Woodgate et al. |
| 2017/0132528 A1 | 5/2017 | Aslan et al. |
| 2017/0134720 A1 | 5/2017 | Park et al. |
| 2017/0195662 A1 | 7/2017 | Sommerlade et al. |
| 2017/0354882 A1 | 12/2017 | Kono et al. |
| 2017/0364149 A1 | 12/2017 | Lu et al. |
| 2018/0035886 A1 | 2/2018 | Courtemanche et al. |
| 2018/0158246 A1 | 6/2018 | Grau et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 102012742 A | 4/2011 |
| CN | 102147079 A | 8/2011 |
| CN | 103310186 A | 9/2013 |
| CN | 104951808 A | 9/2015 |
| EP | 0653891 A1 | 5/1995 |
| EP | 0830984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| JP | H10142556 A | 5/1998 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |

(56) References Cited

FOREIGN PATENT DOCUMENTS

| KR | 20110006773 A | 1/2011 |
|---|---|---|
| KR | 20110017918 A | 2/2011 |
| KR | 20120049890 A | 5/2012 |
| RU | 2493601 C1 | 9/2013 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2007111436 A1 | 10/2007 |
| WO | 2011020962 A1 | 2/2011 |
| WO | 2011148366 A1 | 12/2011 |
| WO | 2012158574 A1 | 11/2012 |
| WO | 2016132148 A1 | 8/2016 |

OTHER PUBLICATIONS

Bahadur, "Liquid crystals applications and uses," World Scientific, vol. 1, p. 178 (1990).
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
Bucila et al., "Model compression", Proceedings of the Twelfth ACM SIGKDD International Conference on Knowledge Discovery and Data Mining: Aug. 20-23, 2006, Philadelphia, PA USA, New York, NY: ACM Press, 2 Penn Plaza, Suite 701 New York, NY 10121-0701 USA, Aug. 20, 2006 (Aug. 20, 2006), pp. 535-541.
Cao et al., "Real-Time High-Fidelity Facial Performance Capture." ACM Transactions on Graphics (SIGGRAPH 2015).
Cao et al., "Realtime Multi-Person 2D Pose Estimation using Part Affinity Fields." IEEE/CVPR 2017.
CN-201680028919.9—Notification of the 1st Office Action dated Nov. 4, 2020 of China Patent Office.
CN-201780006239.1—Notification of the 1st Office Action dated Sep. 30, 2020 of China Patent Office.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61 (1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
Ekman et al., "Facial Action Coding System: A Technique for the Measurement of Facial Movement.", Consulting Psychologists Press, Palo Alto, 1978.
EP-17736268.8 European Extended Search Report of European Patent Office dated Jul. 12, 2019.
EP-18844651.2 European Partial Search Report of European Patent Office dated May 3, 2021.
Ganin et al., "DeepWarp: Photorealistic Image Resynthesis for Gaze Manipulation", Jul. 25, 2016, XP055295123, Retrieved from Internet: URL: http://arxiv.org/pdf/1607.07215v2.pdf (retreived on Jan. 10, 2018].
Giger et al., "Gaze Correction with a Single Webcam", Proceedings of IEEE ICME 2014 (Chengdu, China, Jul. 14-18, 2014).
Hinton et al., "Distilling the Knowledge in a Neural Network", Corr (ARXIV), vol. 1503.02531v1, Mar. 9, 2015 (Mar. 9, 2015), pp. 1-9.
Ho, "Random Decision Forests", Proceedings of the 3rd International Conference on Document Analysis and Recognition, Montreal, QC, pp. 278-282, Aug. 14-16, 1995.
Ian Sexton et al.: "Stereoscopic and autostereoscopic display-systems",—IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].
International Preliminary Report on Patentability dated Sep. 26, 2017 in International Patent Application No. PCT/RU2016/000118.
International Search Report and Written Opinion dated Apr. 18, 2017 in International Patent Application No. PCT/US17/12203.
International Search Report and Written Opinion dated Aug. 25, 2016 in International Patent Application No. PCT/RU2016/000118.
International Search Report and Written Opinion dated Oct. 16, 2018 in International Patent Application No. PCT/US18/45648.
International search report and written opinion of international searching authority for PCT application PCT/US2018/045648 dated Oct. 16, 2018.
Kalantar, et al. "Backlight Unit With Double Surface Light Emission," J. Soc. Inf. Display, vol. 12, Issue 4, pp. 379-387 (Dec. 2004).
Katsigiannis et al., "A GPU based real-time video compression method for video conferencing", 2013 18th International Conference on Digital Signal Processing (DSP), IEEE, Jul. 2013 (Jul. 2013), pp. 1-6.
Kononenko et al., "Learning to Look Up: Realtime Monocular Gaze Correction Using Machine Learning", Computer Vision and Pattern Recognition, pp. 4667-4675, 2015.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographies: Developers' Handbook", Stereographic Developers Handbook, Jan. 1, 1997, XP002239311, p. 42-49.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al.: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Luo et al., "Face Location in Wavelet-Based Video Compression for High Perceptual Quality Videoconferencing", IEEE Transactions on Circuits and Systems for Video Technology, Institute of Electrical and Electronics Engineers, US, vol. 6, No. 4, Aug. 1996(Aug. 1996).
Marjanovic, M.,"Interlace, Interleave, and Field Dominance," http://www.mir.com/DMG/interl.html, pp. 1-5 (2001).
Marschner et al., "Fundamentals of Computer Graphics.", A K Peters/CRC Press; 4 edition (Dec. 15, 2015).
Ozuysal et al., "Fast Keypoint recognition in Ten Lines of Code", Computer Vision and Pattern Recognition, pp. 1-8, 2007.
Paysan et al. "A 3D Face Model for Pose and Illumination Invariant Face Recognition.", 6th IEEE International Conference on Advanced Video and Signal based Surveillance (AVSS) for Security, Safety and Monitoring in Smart Environments, 2009.
PCT/RU2016/000118 International Preliminary Report on Patentability dated Sep. 26, 2017.
PCT/RU2016/000118 International search report and written opinion of international searching authority dated Aug. 25, 2016.
Redmon et al., "YOLO9000: Better, Faster, Stronger", IEEE/CVPR, 2017.
Ren et al., "Face alignment at 3000 fps via regressing local binary features", CVPR, pp. 1685-1692, 2014.
Saffari et al., "On-line Random Forests," in 3rd IEEE ICCV Workshop on On-line Computer Vision, 2009.
Sahoo et al., "Online Deep Learning: Learning Deep Neural Networks on the Fly", School of Information Systems, Singapore Management University (https://arxiv.org/abs/1711.03705), 2017, pp. 1-9.
Smith et al., Gaze locking: passive eye contact detection for human-object interaction. In Proceedings of the 26th annual ACM Symposium on User interface software and technology, pp. 271-280, ACM 2013.

(56) References Cited

OTHER PUBLICATIONS

Sun et al., "Construction and compression of face models for multi-party videoconferencing with multi-camera", 2013 6th International Congress on Image and Signal Processing (CISP), IEEE, vol. 2, Dec. 16, 2013 (Dec. 16, 2013), pp. 948-952.
Tabiryan et al.,"The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19 (2009).
Viola and Jones, "Rapid Object Detection using a Boosted Cascade of Simple Features", pp. 1-9 CVPR 2001.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Xiong et al., "Supervised descent method and its applications to face alignment", In Computer Vision Pattern Recognition (CVPR), 2013 IEEE Conference, pp. 532-539.
Yang, "Mutli-scale recognition with DAG-CNNs", ICCV 2015.
Yim et al., "A Gift from Knowledge Distillation: Fast Optimization, Network Minimization and Transfer Learning", 2017 IEEE Conference on Computer Vision and Pattern Recognition (CVPR), IEEE Computer Society, US, Jul. 21, 2017 (Jul. 21, 2017), pp. 7130-7138.
Yip, "Face and Eye Rectification in Video Conference Using Artificial Neural Network", IEEE International Conference on Multimedia and Expo, 2005, pp. 690-693.
Zach et al., "A Duality Based Approach for Realtime TV-L1 Optical Flow", Pattern Recognition (Proc. DAGM), 2007, pp. 214-223.
Zheng et al., "Conditional Random Fields as Recurrent Neural Networks.", International Conference on Computer Vision (ICCV), 2015.
Chi et al., "Hybrid Particle and Kalman Filtering for Pupil Tracking in Active IR Illumination Gaze Tracking System", Hindawi Publishing Corporation, vol. 2014, Article ID 426234, 17 pages, 2014.
Chou et al., "Face-off: Automatic Alteration of Facial Features", Department of Information Management National Taiwan University of Science and Technology, pp. 1-16, 2012.
Funes-Mora et al., "Gaze Estimation in the 3D Space Using RGB-D Sensors", Idiap Research Institute, Switzerland, pp. 1-23, Nov. 13, 2015.
Guo et al., "Automatic landmark annotation and dense correspondence registration for 3D human facial images", BMC Bioformatics 2013, 14:232, pp. 1-12, 2013.
Hu et al., A hierarchical dense deformable model for 3D face reconstruction form skull, Article in Multimedia Tools and Applications, Springer Science + Business Media, vol. 64: pp. 345-364, May 2013.
Jain et al., "Learning Human Pose Estimation Features with Convolutional Networks", arXiv:1312.7302v6, [cs.CV], pp. 1-11, Apr. 23, 2014.
Kang et al., "Combining random forest with multi-block local binary pattern feature selection for multiclass head pose estimation", The Department of Electronics Engineering, Ewha W. University, Seoul, Republic of Korea, PLOS ONE, pp. 1-24, Jul. 17, 2017.
Kisku et al., "Multithread Face Recognition in Cloud", Hindawi Publishing Corporation, Journal of Sensors, vol. 2016, Article ID 2575904, 21 pages, 2016.
Lin et al., "Real-time eye-gaze estimation using a low-resolution webcam", Springer Science + Business Media, LLC, Multimed Tools Appln (2013) 65:543-568, published online Aug. 14, 2012.
Patil et al., "Expression invariant face recognition using semidecimated DWT, Patch-LDSMT, feature and score level fusion", Article in Applied Intelligence, pp. 1-34, Jun. 2016.
Patil et al., "3-D face recognition: Features, databases, algorithms and challenges", Article in Artificial Intelligence Review, An International Science and Engineering Journal, ISSN 0269-2821, Springer Science + Business Media Dordrecht 2015, 52 pages, Oct. 2015.

Pisharady et al., "Pose Invariant Face Recognition Using Neuro-Biologically Inspired Features", International Journa of Future Computer and Communication, vol. 1, No. 3, pp. 316-320, Oct. 2012.
Qin et al., "Eye Gaze Correction with a Single Webcam Based on Eye-Replacement", Springer International Publishing Switzerland ISVC 2015, pp. 599-609, 2015.
Regenbrecht et al., "Mutual Gaze Support in Videoconferencing Reviewed", Article in Communications of the Association for Information Systems, vol. 37, Article 45, 1-27 pages. Nov. 2015.
Saffari et al., "On-line Random Forests", 3rd IEEE ICCV Workshop, On-line Computer Vision, 2009.
Sang et al., "Pose-Invariant Face Recognition via RGB-D Images", Hindawi Publishing Corporation, Computational Intelligence and Neuroscience, vol. 2016, Article ID 3563758, 9 pages, 2016.
Ucar, "Color Face Recognition Based on Steerable Pyramid Transform and Extreme Learning Machines", Hindawi Publishing Corporation, The Scientific World Journal, vol. 2014, Article ID 628494, 15 pages, 2014.
Van Der Hoest, "Eye Contact in Leisure Video Conferencing", Master Erasmus Mundus in Color in Information and Media Technology (CIMET), Gjovik University College, Master Thesis Report, pp. 1-131, Jul. 15, 2012.
Wolf et al., "An Eye for an Eye: A Single Camera Gaze-Replacement Method", The Blavatnik School of Computer Science Tel-Aviv University, 1-8 pages, 2010.
CN-201880064948.X Notification of the 1st Office Action of the Chinese Patent Office dated Apr. 21, 2023.
Burt et al., "A Multiresolution Spline with Application to Image Mosaics", RCA David Sarnoff Research Center, ACM Transactions of Graphics, vol. 2, No. 4, Oct. 1983, pp. 217-236.
Cham et al., "Analogous View Transfer for Gaze Correction in Video Sequences", Seventh International Conference on Control, Automation Robotics and Vision (ICARCV'02), Dec. 2002, Singapore, pp. 1415-1420.
Dodge et al., "Introduction to Machine Learning and Deep Learning: A Hands-On Starter's Guide", Copyright 2017-2020 [https://deeplearningtextbook.org] Powered by GoDaddy Website Builder.
Fleet et al., "Design and Use of Linear Models for Image Motion Analysis", International Journal of Computer Vision 36(3), 171-193, 2000, 2000 Kluwer Academic Publishers, Manufactured in the Netherlands.
Gemmell et al., "Gaze Awareness for Video-Conferencing A Software Approach", IEEE Multimedia, Oct.-Dec. 2000, pp. 1-10.
Goodfellow et al., "Deep Learning", The MIT Press Cambridge , Massachusetts, London, England, 2016 Massachusetts Institute of Technology.
Hladnik, "Image Compression and Face Recognition: Two Image Processing Applications of Principal Component Analysis", International Circular of Graphic Education and Research, Issue No. 6 2013, pp. 56-61.
Ho et al., "Gaze Correction Using 3D Video Processing For Videoconferencing", School of Information and Communications, Gwangju Institute of Science and Technology (GIST), 2015 IEEE ChinaSIP 2015, pp. 496-499.
Jain, " Fundamentals of Digital Image Processing", Prentice Hall Information and Systems Sciences Series, Thomas Kailath, Series Edition, 1989 by Prentice-Hall, Inc. A Division of Simon & Schuster, New Jersey, USA.
Kononenko, "Learnable Warping-Based Approach to Image Re-Synthesis with Application to Gaze Redirection", doctoral thesis, Doctoral Program in Computational and Data Science and Engineering, Moscow 2017.
Liebe et al., "Computer Vision—ECCV 2016", 14th European Conference, Amsterdam, The Netherlands, Oct. 11-14, 2016, Proceedings, Part II.
Liu et al., "Optical Flow and Principal Component Analysis-Based Motion Detection in Outdoor Videos", Hindawi Publishing Corporation, EURASIP Journal on Advances in Signal Processing, vol. 2010, Article ID 680623, 6 pages.
McCutchen, "Microsoft Computer Dictionary", Fourth Edition, Published by Microsoft Press, Redmond, Washington 1999.

(56) References Cited

OTHER PUBLICATIONS

Murphy, "Machine Learning A Probabilistic Perspective", The MIT Press, Cambridge Massachusetts, London England, 2012 Massachusetts Institute of Technology.
Sonka et al., "Image Processing, Analysis, and Machine Vision", Fourth Edition, The University of Iowa, Iowa City, 2008 Cengage Learning, 2015.
Vetterli et al., "Waveletes and Subband Coding", 1995 by Prentice Hall PTR, A Simon and Schuster Company, New Jersey, USA.
Wolberg, "Digital Image Warping", Department of Computer Science, Columbia University, New York, IEEE Computer Society Press, Los Alamitos, California, Third Edition 1994, USA, The Institute of Electrical and Electronics Engineers, Inc.
Wood et al., :GazeDirector: Fully Articulated Eye Gaze Redirection in Video, Univ. of Cambridge, UK, arXiv: 1704.08763v1 [cs.CV] Apr. 27, 2017, pp. 1-10.
Wulff et al., "Efficient Sparse-to-Dense Optical Flow Estimation using a Learned Basis and Layers", Max Planck Institute for Intelligent Systems, Tubingen, Germany, pp. 120-130.
Yang et al., "Eye Gaze Correction with Stereovision for Video-Teleconferencing", A. Heyden et al. (Eds.): ECCV 2002, LNCS 2351, pp. 479-494 2002, Springer-Verlag Berlin Heidelberg 2002.
Zitnick et al., Manipulation of Video Eye Gaze and Head Orientation for Video Teleconferencing, Technical Report MSR-TR-99-26, Microsoft Research, Microsoft Corp., Redmond, WA, Jun. 16, 1999, pp. 1-13.

ADJUSTING A DIGITAL REPRESENTATION OF A HEAD REGION

TECHNICAL FIELD

This application relates to adjusting a digital representation, such as an image or a three-dimensional geometrical representation, of a head region, particularly a facial and/or neck region. The application relates particularly to adjusting target features of the digital representation of the head region, for example to correct a perceived gaze direction of eyes, or to modify the texture and/or shape of features such as the nose, mouth, chin or neck.

BACKGROUND

In many systems, images of a head, which may comprise single images at different times, or stereoscopic pairs of images or other multi-view images, may be captured in one device and displayed on a different device for viewing by an observer. One non-limitative example is a system for performing teleconferencing between two telecommunications devices. In that case, each device may capture images of the observer of that device and transmit them to the other device over a telecommunications network for display and viewing by the observer of the other device. Digital representations other than images and/or complementary to images may also be captured, for example using depth measurements (e.g. using a time-of-flight camera).

When an image or other digital representation of a head is captured and displayed, the gaze of the head may not be directed at the observer. This may be caused for example by the gaze of the head not being directed at the sensing system (e.g. camera system) used to capture the digital representation (e.g. image), for example because a user whose head is imaged is observing a display in the same device as a camera system and the camera system is offset above (or below) that display. In that case, the gaze in the displayed images will be perceived to be downwards (or upwards). The human visual system has evolved high sensitivity to gaze during social interaction, using cues gained from the relative position of the iris and white sclera of other observers. Errors in the perceived gaze are disconcerting. For example in a system for performing teleconferencing, errors in the perceived gaze can create unnatural interactions between the users.

The present disclosure is concerned with processing techniques (e.g. image processing techniques) for adjusting digital representations (e.g. images) of a head region to correct the perceived gaze and/or to improve other aspects of a computer-generated display of the head region. The present disclosure is particularly concerned with implementing such processing techniques with minimal demands on computer hardware and/or power such that they provide results at or near input data frame rate or user feedback requirements.

BRIEF SUMMARY

According to a first aspect of the present disclosure, there is provided a method of generating reference data for adjusting a digital representation of a head region, the method comprising: receiving training data comprising: a set of input patches, each input patch comprising a target feature of a digital representation of a head region prior to adjustment of the digital representation of the head region, wherein the target feature is the same for each input patch; and a set of output patches in one-to-one correspondence with the input patches, each output patch comprising the target feature of the digital representation of the head region after adjustment of the digital representation of the head region; using a first machine learning algorithm to generate first reference data using the training data, the first reference data comprising editing instructions for adjusting the digital representation of the head region for a range of possible digital representations of the head region; and using a second machine learning algorithm to generate second reference data using the same training data as the first machine learning algorithm and the first reference data generated by the first machine learning algorithm, the second reference data comprising editing instructions for adjusting the digital representation of the head region for a range of possible digital representations of the head region.

The described use of two machine learning algorithms allows an improved balance to be achieved between accuracy of the adjustment process and speed of execution. The first machine learning algorithm can be configured to provide highly detailed first reference data, which provides high accuracy. Use of this first reference data directly in a processing technique (e.g. image processing technique) to adjust a digital representation (e.g. image or three-dimensional geometrical representation) of a head region would be relatively expensive in terms of computational resources because of the high level of detail. By arranging instead for the first reference data to be provided to a second machine learning algorithm, which provides, based on the first reference data and the original training data, the reference data (the second reference data) that is to be used for the adjustment of the digital representation of the head region, it is possible to benefit to an extent from the high accuracy of the first machine learning algorithm whilst also providing reference data that is less detailed and thus easier to process efficiently when performing the adjustment of the digital representation of the head region. The quality of the reference data provided by the second machine learning algorithm is found to be significantly improved when the second machine learning algorithm is provided with both the first reference data and the training data in comparison to when the second machine learning algorithm is provided only with the training data.

In an embodiment, efficiency is further improved by providing editing instructions (e.g. image editing instructions) in the second reference data in a compressed representation. The use of a compressed representation reduces data storage and bandwidth requirements during use of the editing instructions to perform adjustment of a digital representation of a head region.

According to a second aspect of the present disclosure, there is provided a device configured to perform a similar method to the first aspect of the invention.

According to a third aspect of the present disclosure, there is provided a method of adjusting a digital representation of a head region, the method comprising: identifying a target patch in the digital representation of the head region, the target patch comprising a target feature of the digital representation of the head region; deriving a feature vector from plural local descriptors of the target patch; using the feature vector to select editing instructions from reference data, the reference data comprising editing instructions for a range of possible values of the feature vector; and applying the selected editing instructions to the target patch to adjust the digital representation of the head region, wherein the editing instructions in the reference data are provided in a compressed representation.

According to a fourth aspect of the present disclosure, there is provided a device configured to perform a similar method of the third aspect of the invention.

The use of a compressed representation reduces data storage and bandwidth requirements.

According to a fifth aspect of the present disclosure, there is provided a method of training a machine learning algorithm to adjust a digital representation of a head region, comprising: receiving training data comprising: a set of input patches, each input patch comprising a target feature of a digital representation of a head region prior to adjustment of the digital representation of the head region, wherein the target feature is the same for each input patch; and first reference data generated by a pre-trained first machine learning algorithm, the first reference data comprising a set of editing instructions in one-to-one correspondence with the input patches, each editing instruction being for adjusting the digital representation of the head region; updating a pre-trained second machine learning algorithm trained to generate second reference data, where the input for the updating comprises the training data and the generated first reference data, the second reference data comprising editing instructions for adjusting the digital representation of the head region.

According to a sixth aspect of the present disclosure, there is provided a method of training a machine learning algorithm to adjust a digital representation of a head region, the method comprising: receiving training data comprising a set of input digital representations of a head region; training a first machine learning algorithm using the training data to perform an adjustment of a digital representation of a head region; using the trained first machine learning algorithm to generate first reference data, the first reference data comprising an adjusted digital representation of the head region for each of at least a subset of the input digital representations, each adjusted digital representation being obtained by performed the adjustment that the first machine learning algorithm was trained to perform; and training a second machine learning algorithm using at least a subset of the training data used to train the first machine learning algorithm and the first reference data to perform the same adjustment of a digital representation of a head region as the first machine learning algorithm.

BRIEF DESCRIPTION OF THE DRAWINGS

Non-limitative embodiments are illustrated by way of example in the accompanying figures, in which like reference numbers indicate similar parts, and in which.

DETAILED DESCRIPTION

Figure 1:
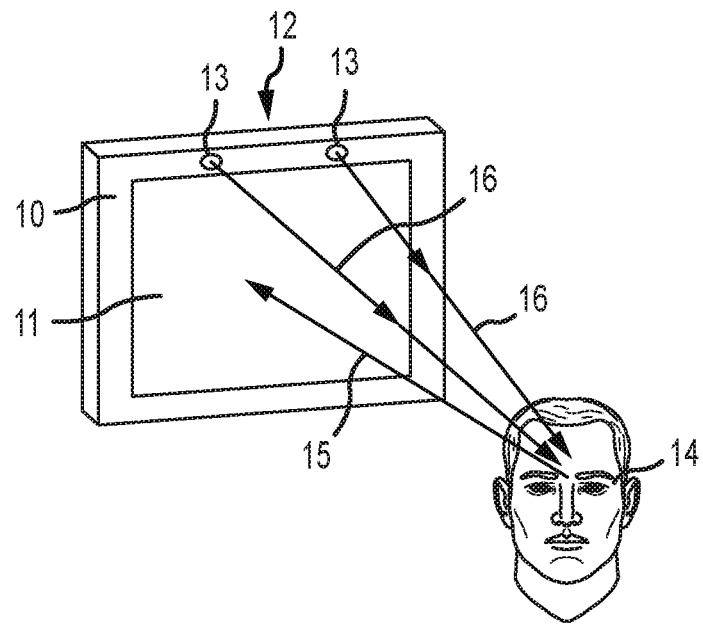
FIG. 1 is a schematic perspective view of a device that captures a stereoscopic pair of images.
Figure 2:
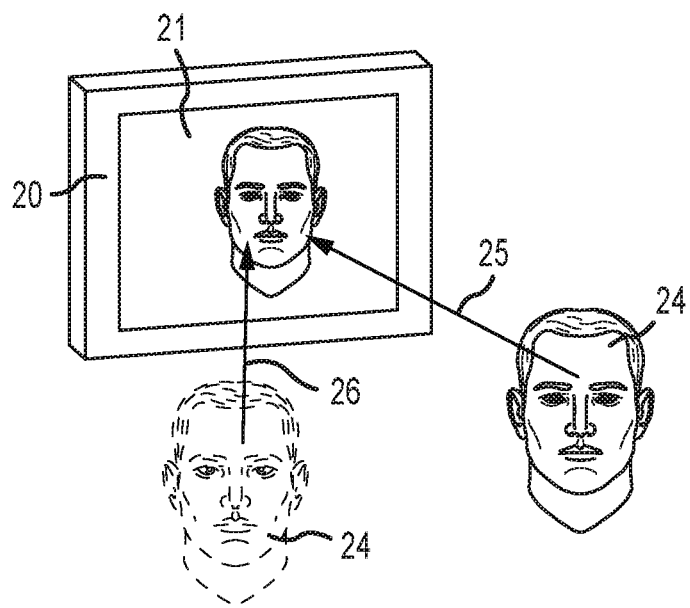
FIG. 2 is a schematic perspective view of a device that displays the stereoscopic pair of images.

FIG. 1 and FIG. 2 illustrate how incorrect gaze is perceived when a stereoscopic pair of images of a head is captured by the device 10 shown in FIG. 1 which will be referred to as the source device 10, and displayed on a different device 20 shown in FIG. 2 which will be referred to as the destination device 20. Capturing of a stereoscopic pair of images is shown as an example. A similar effect can occur when a monocular image is captured and when more than two views of the head are captured. A similar effect can also occur when alternative or additional sensing techniques are used to build a digital representation of the head (e.g. where a depth sensor such as a time-of-flight camera is used to obtain three-dimensional geometrical information about positions on the surface of the head).

In the embodiment shown, the capture device 10 includes a display 11 and a camera system 12. In this particular example, the camera system comprises two cameras 13 in order to capture the stereoscopic pair of images of the head of a source observer 14. In a monocular implementation a single camera may be provided instead of the two cameras 13. In other implementations a depth sensor is alternatively or additionally provided. The source observer 14 views the display 11, along line 15. The cameras 13 (optionally including one or more depth sensors) of the camera system 12 are offset from the display 11, in this case being above the display 11. Thus, the cameras 13 effectively look down on the source observer 14 along line 16.

The display device 20 includes a display 21, which in this example can be a stereoscopic display of any known type, for example an autostereoscopic display of any known type. The display 21 displays the stereoscopic pair of images as captured by the capture device 10. A destination observer 24 views the display 21. If the destination observer 24 is located in a normal viewing position perpendicular to the center of the display 21, as shown by the hard outline of the destination observer 24, then the gaze of the source observer 14 is perceived by the destination observer 24 to be downwards, rather than looking at the destination observer 24, because the cameras 13 of the source device 10 look down on the source observer 14.

Although the cameras 13 are above the display 11 in this example, the cameras 13 could in general could be in any location adjacent the display 11, and the gaze of the source observer 14 perceived by the destination observer 24 would be correspondingly incorrect.

If the destination observer 24 is located in an offset viewing position, as shown by the dotted outline of the destination observer 24 so that the destination observer 24 views the display 21 along line 26, then the offset of the destination observer 24 creates an additional error in the gaze of the source observer 14 perceived by the destination observer 24. A similar additional error in the perceived gaze of the source observer 14 occurs if the destination observer 24 is located in the normal viewing position along line 25, but the displayed image (or stereoscopic pair of images in this example) is displayed on the display 25 in a position offset from the center of the display 25.

A stereoscopic pair of images is an example of multi-view images where there are two images. Although FIG. 1 illustrates an example where the camera system 12 includes two cameras 13 that capture a stereoscopic pair of images, alternatively the camera system may include more than two cameras 13 that capture more than two multi-view images, in which case similar issues of incorrect perceived gaze exist on display. The camera system may alternatively include only one camera and/or one or more depth sensors.

Figure 3:
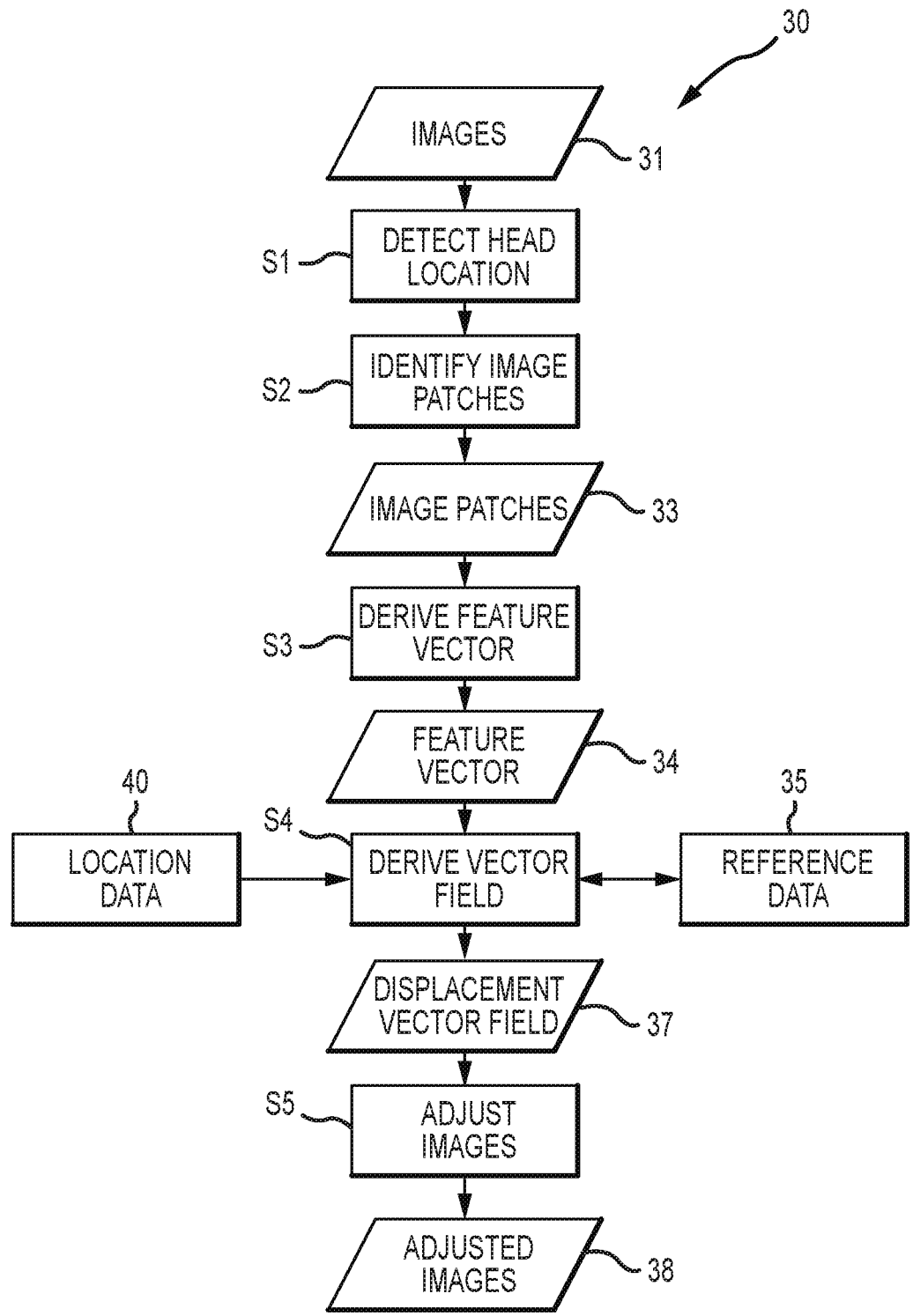
FIG. 3 is a flow chart of a method of adjusting a stereoscopic pair of images.

FIG. 3 illustrates a method of adjusting multi-view images to correct such errors in the perceived gaze. The method of FIG. 3 is a specific example of a method of adjusting digital representations of a head region in a case where the digital representations comprise images of the head region and where the images comprise one or more multi-view images of the head region. For simplicity, this method will be described with respect to the adjustment of multi-view images comprising a stereoscopic pair of images. The method may be generalized to multi-view images comprising more than two images, simply by performing similar processing on a larger number of images. The method may also be generalized to the case where single view (monocular) images of the head region are used and to the case where information from other sensing modalities, such as depth measurements, is included within the digital representations of the head region.

The method may be performed in an image processor 30 (or other processor). The image processor 30 may be implemented by a processor executing a suitable computer program or by dedicated hardware or by some combination of software and hardware. Where a computer program is used, the computer program may comprise instructions in any suitable language and may be stored on a computer readable storage medium, which may be of any type, for example: a recording medium which is insertable into a drive of the computing system and which may store information magnetically, optically or opto-magnetically; a fixed recording medium of the computer system such as a hard drive; or a computer memory.

The image processor 30 (or other processor) may be provided in the source device 10, the destination device 10 or in any other device, for example a server on a telecommunications network, which may be suitable in the case that the source device 10 and the destination device 10 communicate over such a telecommunications network.

In this example, a stereoscopic pair of images 31 are captured by the camera system 12. Although the camera systems 12 is illustrated in FIG. 1 as including two cameras 13, this is not limitative and more generally the camera system 13 may have the following properties.

The camera system comprises a set of one or more cameras 13, with at least two cameras 13 in the case where multi-view images are processed. Where two cameras are provided, the cameras are typically spaced apart by a distance less than the average human intrapupilar distance. In the alternative that the method is applied to more than two multi-view images, then there are more than two cameras 13, that is one camera 13 per image. In some embodiments, a depth sensor is provided for obtaining three-dimensional geometrical information about a surface of the head region, optionally in addition to one or more other cameras (e.g. optical cameras). The depth sensor may comprise a time-of-flight camera.

Where plural cameras 13 are provided, the cameras 13 may be spatially related to each other and the display 11. The spatial relationship between the cameras 13 themselves and between the cameras 13 and the display 11 is known in advance. Known methods for finding the spatial relationship may be applied, for example a calibration method using a reference image, or specification a priori.

The camera or cameras 13 face in the same direction as the display 11. Thus, when the source observer 14 is viewing the display 11, then the camera or cameras 13 face the source observer 14 and the captured information, such as depth information, image or images (e.g. stereoscopic pair of images) are digital representations (e.g. images and/or three-dimensional geometrical representations) of the head of the source observer 14. Different cameras in the camera system can have different fields of view.

The camera system 12 may include cameras 13 having different sensing modalities, including but not limited to visible light, infrared, and time-of-flight (depth).

In some embodiments, the main output of the camera system 13 is images 31 which are typically video images output at a video rate. The output of the camera system 13 may also include data representing the spatial relationship between the cameras 13 and the display 11, the nature of the sensing modalities and internal parameters of the cameras 13 (for example focal length, optical axis) which may be used for angular localization, as well as three-dimensional geometrical information, for example from depth measurements.

An example of the method performed on a digital representation of a head region comprising a stereoscopic pair of images 31, for the case of adjustment of eye regions, is as follows. To illustrate this example method, reference is also made to FIG. 4 which shows an example of the stereoscopic pair of images 31 at various stages of the method.

In step S1, the stereoscopic pair of images 31 are analyzed to detect the location of the head and in particular the eyes of the source observer 14 within the stereoscopic pair of images 31. This is performed by detecting presence of a head, tracking the head, and localizing the eyes of the head. Step S1 may be performed using a variety of techniques that are known in the art.

One possible technique for detecting the presence of the head is to use Haar feature cascades, for example as disclosed in Viola and Jones, "Rapid Object Detection using a Boosted Cascade of Simple Features", CVPR 2001, pp 1-9, which is herein incorporated by reference in its entirety.

One possible technique for tracking the head is to use the approach of Active Appearance Models to provide the position of the head of the subject, as well as the location of the eyes, for example as disclosed in Cootes et al., "Active shape models—their training and application", Computer Vision and Image Understanding, 61(1):38-59, January 1995 and in Cootes et al. "Active appearance models", IEEE Trans. Pattern Analysis and Machine Intelligence, 23(6): 681-685, 2001, both of which are herein incorporated by reference in their entireties.

In step S1, typically, a set of individual points ("landmarks") are set to regions of the face, typically the eyes, for example corners of the eye, upper and lower lid locations, etc., thereby localizing the eyes.

Figure 4:
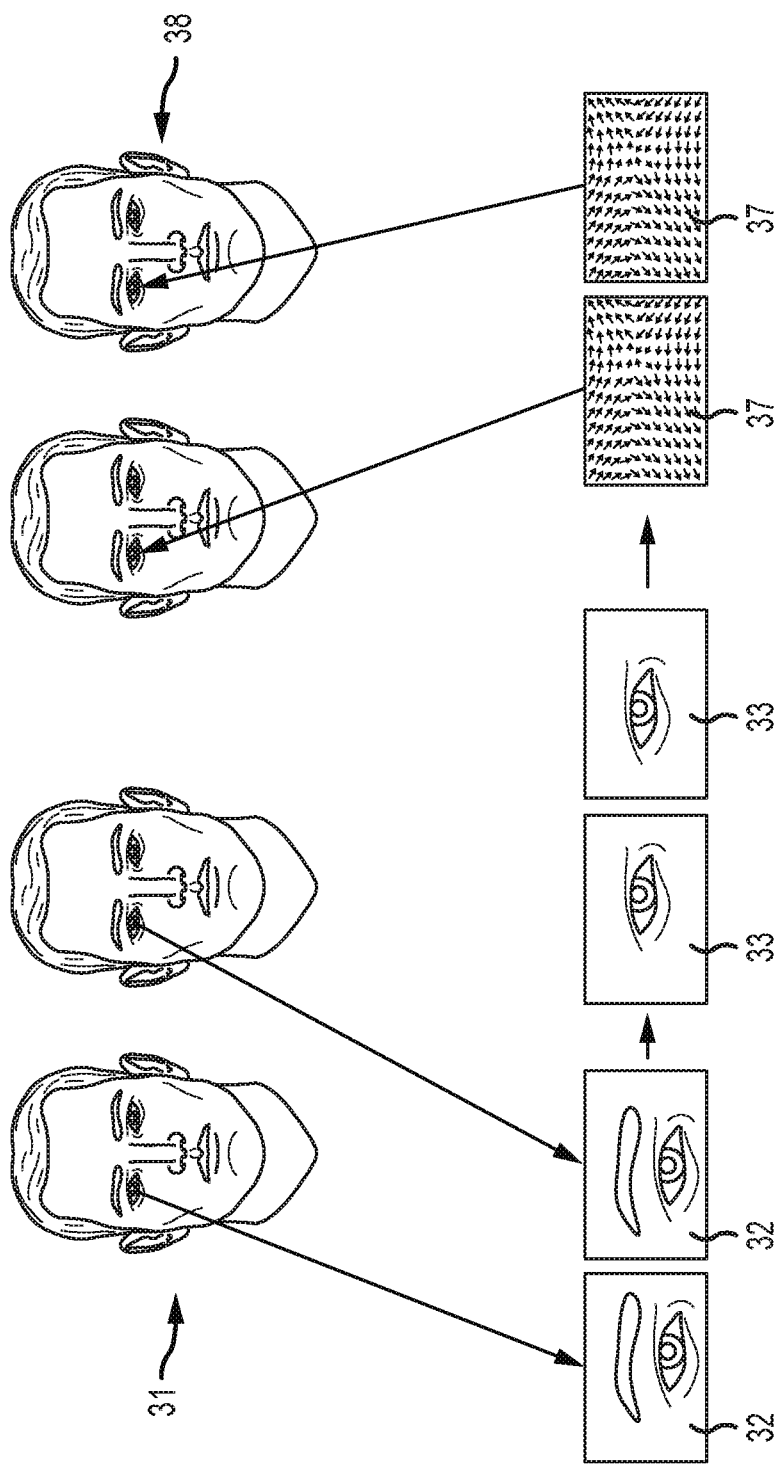
FIG. 4 is a diagram illustrating the processing of the stereoscopic pair of images in the method of FIG. 3.

In step S2, patches representing portions of a digital representation of the head region, which in this example may be referred to image patches, containing the left and right eyes of the head, respectively, are identified in each image 31 of the stereoscopic pair. FIG. 4 shows the identified image patches 32 of the right eye in each image 31 (the image patches for the left eye being omitted in FIG. 4 for clarity).

Figure 5:
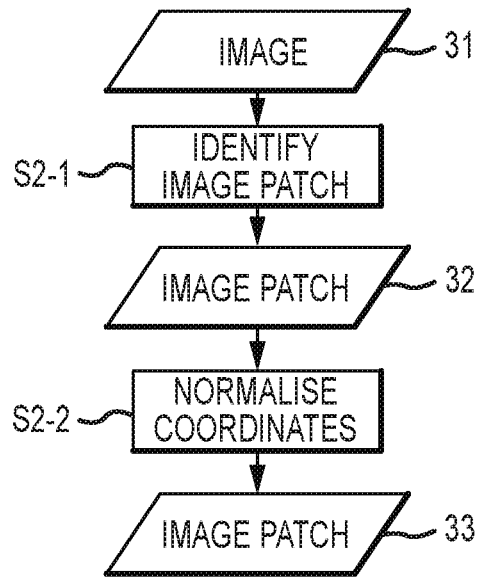
FIG. 5 is a flow chart of a step of extracting an image patch.

Step S2 may be performed as shown in FIG. 5, as follows.

In step S2-1, image patches 32 containing the left and right eyes of the head are identified in each image 31 of the stereoscopic pair. This is done by identifying an image patch 39 in each image 31 located around the identified points ("landmarks") corresponding to features of an eye, as shown for example in FIG. 4.

In step S2-2, the image patches 32 identified in step S2-1 are transformed into a normalized coordinate system, being the same normalized coordinate system as used in the machine learning process which is described further below. The transformation is chosen to align the points ("landmarks") of the eye within the image patch that were identified in step S1, with predetermined locations in the normalized coordinate system. The transformation may include translation, rotation and scaling, to appropriate extents to achieve that alignment. The output of step S2-2 is identified image patches 33 of the right eye in each image in the normalized coordinate system as shown for example in FIG. 4.

The following steps may be performed separately (a) in respect of the image patches containing the left eyes of the head in each image 31 of the stereoscopic pair, and (b) in respect of the image patches containing the right eyes of the head in each image 31 of the stereoscopic pair (in this example). For brevity, the following description will refer merely to image patches and eyes without specifying the left or right eye, but noting the same steps are performed for both left and right eyes.

In step S3, a feature vector 34 is derived from plural local descriptors (representing information about a local region in a patch), which in this example may be referred to as local image descriptors, of an image patch 33 in at least one image 31 of the stereoscopic pair (in this example). Depending on the approach and as described further below, this may be an image patch in a single image 31 of the stereoscopic pair or may be both images 31 of the stereoscopic pair. Thus, the local image descriptors are local image descriptors derived in the normalized coordinate system.

The feature vectors 34 are representations of the image patches 33 that are suitable for use in looking up reference data 35 to be used for adjusting the image patches. The reference data 35 may comprise reference displacement vector fields that represent transformations of the image patch, or other representations of transformations of the image patch, including compressed representations as described below, and are associated with possible values of the feature vector.

The reference data 35 is obtained and analyzed in advance using a machine learning technique. The machine learning technique may derive the form of the feature vectors 34 and associate transformations such as the reference displacement vector fields with the possible values of the feature vector. A specific example of a machine learning technique applied in the case where it is desired to correct gaze using digital representations of a head region comprising images of the head region, will now be described before reverting to the method of FIG. 3.

The training input to the machine learning technique is two sets of images (or image patches), which may be stereoscopic pairs of images or monoscopic images, as discussed further below. Each set may comprise images of the head of the same group of individuals but captured from cameras in different locations relative to the gaze so that the perceived gaze differs as between them (in the case where gaze is to be corrected).

The first set are input images, being images of each individual with an incorrect gaze where the error is known a priori. In particular, the images in the first set may be captured by at least one cameras in a known camera location where the gaze of the individual which is in a different known direction. For example in the case of the source device of FIG. 1, the camera location may be the location of a camera 13 and while the gaze of the imaged individual is towards the center of the display 11.

The second set are output images, being images of each individual with correct gaze for a predetermined observer location relative to a display location in which the image is to be displayed. In the simplest case, the observer location is a normal viewing position perpendicular to the center of the display location, for example as shown by the hard outline of the destination observer 24 in the case of the destination device 20 of FIG. 2.

For each image in the two sets, the image is analyzed to detect the location of the head and in particular the eyes using the same technique as used in step S1 described above, and then image patches containing the left and right eyes of the head, respectively, are identified using the same technique as used in step S2 described above. The following steps may then be performed separately (a) in respect of the image patches containing the left eyes of the head in each image, and (b) in respect of the image patches containing the right eyes of the head in each image. For brevity, the following description will refer merely to image patches and eyes without specifying the left or right eye, but noting the same steps are performed for both left and right eyes in this embodiment.

Each image patch is transformed into the same normalized coordinate system as used in step S2 described above. As described above, the transformation is chosen to align points ("landmarks") of the eye with predetermined locations in the normalized coordinate system. The transformation may include, for example, translation, rotation and/or scaling, to appropriate extents to achieve that alignment.

Thus, the image patches input and output images of each individual are aligned in the normalized coordinate system.

From an input and output image of each individual, there is derived a displacement vector field that represents the transformation of the image patch in the input image required to obtain the image patch of the output image, for example as follows. Defining positions in the image patches by (x,y), the displacement vector field F is given by $$F = \{u(x, y), v(x, y)\}$$

where u and v define the horizontal and vertical components of the vector at each position (x,y).

The displacement vector field F is chosen so that the image patch of the output image O(x,y) is derived from the image patch of the input image I(x,y) as $$O(x, y) = I(x + u(x, y), y + v(x, y))$$

For image data from more than one camera, the system delivers a displacement vector field for the input image from each camera.

The displacement vector field F for an input and output image of an individual may be derived using a process in which a trial feature vector F'={u',v'} is modified to minimize error, optionally in an iterative process, for example in accordance with:

$$\sum |O(x, y) - I(x + u'(x, y), y + v'(x, y))| = \min!$$

By way of non-limitative example, the displacement vector field F may be derived as disclosed in Kononenko et al., "Learning To Look Up: Realtime Monocular Gaze Correction Using Machine Learning", Computer Vision and Pattern Recognition, 2015, pp. 4667-4675, which is herein incorporated by reference in its entirety, wherein the displacement vector field F is referred to as a "flow field".

Another example for editing instructions, which may be referred to as image editing instructions in cases where the digital representation of the head region consists of images, which can be used additionally or as an alternative to the displacement vector field in any of the arrangements disclosed herein, is given by filter field L={k(P, x, y)}, which defines a filter kernel for a given location (x, y). This filter field L is chosen so that the image patch of the output image O(x, y) is derived from the image patch of the input image I(x, y) as O(x, y)=k(P(I, x, y)), x, y)), where P(I, x, y) is a local region around the point (x,y) in the image I, and k(P, x, y) operates on the patch P with coefficients depending on the position (x, y). For example, it could be the output of a convolution of the patch with a Gaussian filter with width depending on the position x in the image, or a brightness increase of a local pixel depending on the vertical position y.

Another example for editing instructions (e.g. image editing instructions) which can be used additionally or as an alternative to the displacement vector field in any of the arrangements disclosed herein, is given by a set of typical image components that make up the edited image area, e.g. texture showing beard stubbles. These are then blended with a factor depending on the image coordinates and local image content (i.e. a texture blending field). Other transformation fields can be used, such as a brightness adjustment field.

A machine learning technique is used to obtain a map from the displacement vector field F (or other editing instructions such as image editing instructions) of each individual to respective feature vectors derived from plural local (e.g. image) descriptors of a target patch of an input image.

The local descriptors (e.g. local image descriptors) capture relevant information of a local part of a patch (e.g. image patch) of an input digital representation of the head region (e.g. an input image) and the set of local descriptors usually form a continuous vectorial output.

The local descriptors input into the machine learning process are of types expected to provide discrimination between different individuals, although the specific image descriptors are selected and optimized by the machine learning process itself. In general, the local descriptors may be of any suitable type, some non-limitative examples which may be applied in any combination being as follows.

The local descriptors may include values of individual pixels or a linear combination thereof. Such a linear combination may be, for example, a difference between the pixels at two points, a kernel derived within a mask at an arbitrary location, or a difference between two kernels at different locations.

The local descriptors may include distances of a pixel location from the position of an eye point ("landmark").

The local descriptors may include SIFT features (Scale-invariant feature transform features), for example as disclosed in Lowe, "Distinctive Image Features from Scale-Invariant Keypoints", International Journal of Computer Vision 60 (2), pp 91-110, which is herein incorporated by reference in its entirety.

The local descriptors may include HOG features (Histogram of Oriented Gradients features), for example as disclosed in Dalal et al. "Histograms of Oriented Gradients for Human Detection", Computer Vision and Pattern Recognition, 2005, pp. 886-893, which is herein incorporated by reference in its entirety.

The local descriptors may include "low level representations" from pre-classification stages in deep learning neural networks, for example as disclosed in Yang and Ramanan, "Multi-scale recognition with DAG-CNNs", ICCV 2015, which is herein incorporated by reference in its entirety. In a classifying deep learning neural network with multiple layers applied to an input digital representation (e.g. image), for example, such low level features could be taken from a layer before the final classification layer of the network.

The derivation of the feature vector from plural local descriptors depends on the type of machine learning applied.

In a first type of machine learning technique, the feature vector may comprise features that are values derived from the local descriptors (e.g. local image descriptors) in a discrete space, being binary values or values discretized into more than two possible values. In this case, the machine learning technique associates a reference displacement vector field F derived from the training input with each possible value of the feature vector in the discrete space, so the reference data 35 may provide similar functionality to a look-up table, with the machine learning generating a machine learning parameter set that can be used to generate corresponding editing instructions. This allows a reference displacement vector field F to be simply selected from the reference data 35 on the basis of the feature vector 34 derived in step S3, as described below.

In the case that the feature vector comprises features that are binary values derived from the local descriptors, the feature vector has a binary representation. Such binary values may be derived in various ways from the values of descriptors, for example by comparing the value of a descriptor with a threshold, comparing the value of two descriptors, or by comparing the distance of a pixel location from the position of an eye point ("landmark").

Alternatively, the feature vector may comprise features that are discretized values of the local descriptors. In this case, more than two discrete values of each feature are possible.

Any suitable machine learning technique may be applied, for example using a decision tree, a decision forest, a decision fern or an ensemble or combination thereof, or a neural network.

By way of example, a suitable machine learning technique using a feature vector comprising features that are binary values derived by comparing a set of individual pixels or a linear combination thereof against a threshold, is disclosed in Ozuysal et al. "Fast Keypoint Recognition in Ten Lines of Code", Computer Vision and Pattern Recognition, 2007, pp. 1-8, which is herein incorporated by reference in its entirety.

By way of further example, a suitable machine learning technique using a distance of a pixel location with the position of an eye landmark is disclosed in Kononenko et al., "Learning To Look Up: Realtime Monocular Gaze Correction Using Machine Learning", Computer Vision and Pattern Recognition, 2015, pp. 4667-4675, which is herein incorporated by reference in its entirety.

By way of further example, a suitable machine learning technique using a random decision forest is disclosed in Ho, "Random Decision Forests", Proceedings of the 3rd International Conference on Document Analysis and Recognition, Montreal, QC, 14-16 Aug. 1995, pp. 278-282, which is herein incorporated by reference in its entirety.

In a second type of machine learning technique, the feature vector may comprise features that are discrete values of the local descriptors (e.g. local image descriptors) in a continuous space. In this case, the machine learning technique associates a reference displacement vector field F (in this example, but other editing instructions could be used) derived from the training input with possible discrete values of the feature vector in the continuous space. This allows a displacement vector field F to be derived from the reference data 35 by interpolation from the reference displacement vector fields based on the relationship between the feature vector 34 derived in step S3 and the values of the feature vector associated with the reference displacement vector fields.

Any suitable machine learning technique may be applied, for example using support vector regression.

By way of example, a suitable machine learning technique using support vector regression is disclosed in Drucker et al. "Support Vector Regression Machines", Advances in Neural Information Processing Systems 9, NIPS 1996, 155-161, which is herein incorporated by reference in its entirety. The output of the technique is a continuously varying set of interpolation directions that form part of the reference data 35 and are used in the interpolation.

The machine learning technique, regardless of its type, inherently also derives the form of the feature vectors 34 that is used to derive the reference displacement vector fields F (or other image editing instructions). This is the form of the feature vectors 34 that is derived in step S3.

The description now reverts to the method of FIG. 3.

In step S4, at least one displacement vector field 37 representing a transformation of an image patch is derived by using the feature vector 34 derived in step S3 to look up the reference data 35. Due to the derivation of the displacement vector field 37 from the reference data 35, the transformation represented thereby corrects the gaze that will be perceived when the stereoscopic pair of images 31 are displayed.

In the case that the feature vector 34 comprises features that are values in a discrete space and the reference displacement vector fields of the reference data 35 comprise a reference displacement vector field associated with each possible value of the feature vector in the discrete space, then the displacement vector field for the image patch is derived by selecting the reference displacement field associated with the actual value of the derived feature vector 34.

In the case that the feature vector 34 comprises features that are discrete values of the local descriptors in a continuous space, then then the displacement vector field for the image patch is derived by interpolating a displacement vector field from the reference displacement vector fields based on the relationship between the actual value of the derived feature vector 34 and the values of the feature vectors associated with the reference displacement vector fields. In the case that the machine learning technique was support vector regression, this may be done using the interpolation directions that form part of the reference data 35.

In step S5, each image 31 of the stereoscopic pair is adjusted by transforming the image patches containing the left and right eyes of the head in accordance with the derived displacement vector fields 37. This produces an adjusted stereoscopic pair of images 38 as shown in FIG. 4, in which the gaze has been corrected. In particular, the adjustment may be performed using two alternative methods, as follows.

Figure 6:
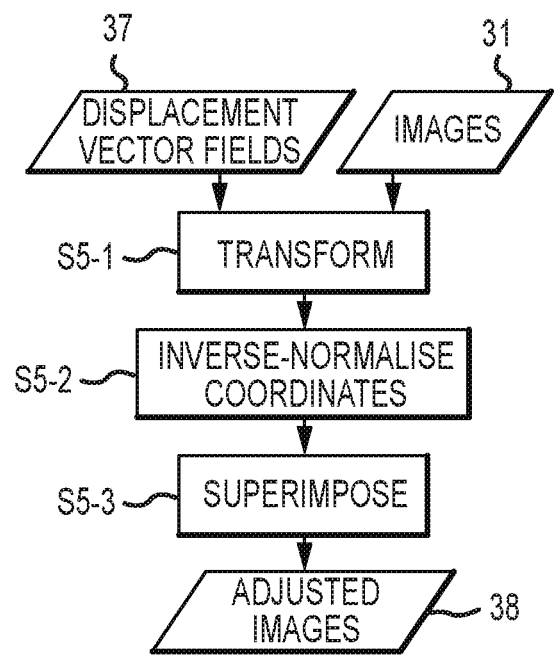
FIG. 6 and FIG. 7 are flow charts of two alternatives for a step of adjusting an image.

A first method for performing step S5 is shown in FIG. 6 and performed as follows.

In step S5-1, the image patch is transformed in the normalised coordinate system in accordance with the corresponding displacement vector field 37 in respect of the same image, thereby correcting the gaze. As described above, for a displacement vector field F the transformation of the image patch of the input image I(x,y) provides the output image O(x,y) in accordance with $$O(x, y) = I(x + u(x, y), y + v(x, y))$$

In step S5-2, the transformed image patch output from step S5-1 is transformed out of the normalised coordinate system, back into the original coordinate system of the corresponding image 31. This is done using the inverse transformation from that applied in step S2-2.

In step S5-3, the transformed image patch output from step S5-2 is superimposed on the corresponding image 31. This may be done with a full replacement within an eye region corresponding to the eye itself, and a smoothed transition between the transformed image patch and the original image 31 over a boundary region around the eye region. The width of the boundary region may be of fixed size or a percentage of the size of the image patch in the original image 31.

Figure 7:
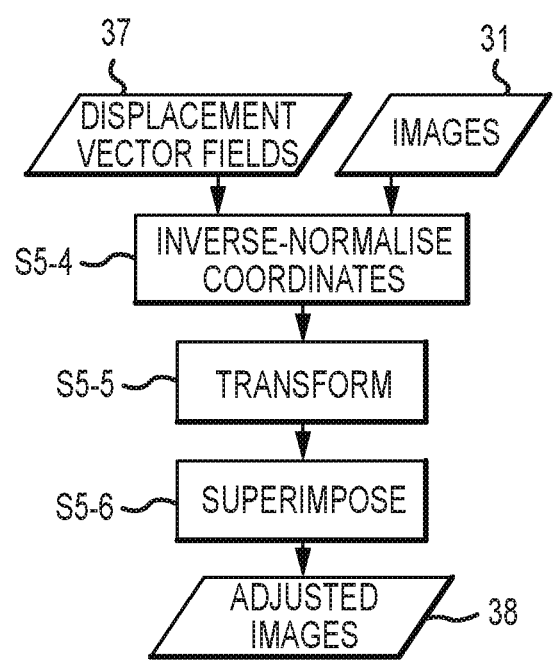

A second method for performing step S5 is shown in FIG. 7 and performed as follows.

In this second, alternative method, the transformation back into the coordinate system of the corresponding image 31 occurs before the transformation of the image patch in accordance with the transformed displacement vector field F.

In step S5-4, the displacement vector field F is transformed out of the normalised coordinate system, back into the original coordinate system of the corresponding image 31. This is done using the inverse transformation from that applied in step S2-2.

In step S5-5, the image patch 32 in the coordinate system of the image 31 is transformed in accordance with the displacement vector field F that has been transformed into the same coordinate system in step S5-4. As described above, for a displacement vector field F the transformation of the image patch of the input image I(x,y) provides the output image O(x,y) in accordance with $$O(x, y) = I(x + u(x, y), y + v(x, y))$$

but this is now performed in the coordinate system of the original image 31.

Step S5-6 is the same as S5-3. Thus, in step S5-6, the transformed image patch output from step S5-5 is superimposed on the corresponding image 31. This may be done with a full replacement within an eye region corresponding to the eye itself, and a smoothed transition between the transformed image patch and the original image 31 over a boundary region around the eye region. The width of the boundary region may be of fixed size or a percentage of the size of the image patch in the original image 31.

Figure 8:
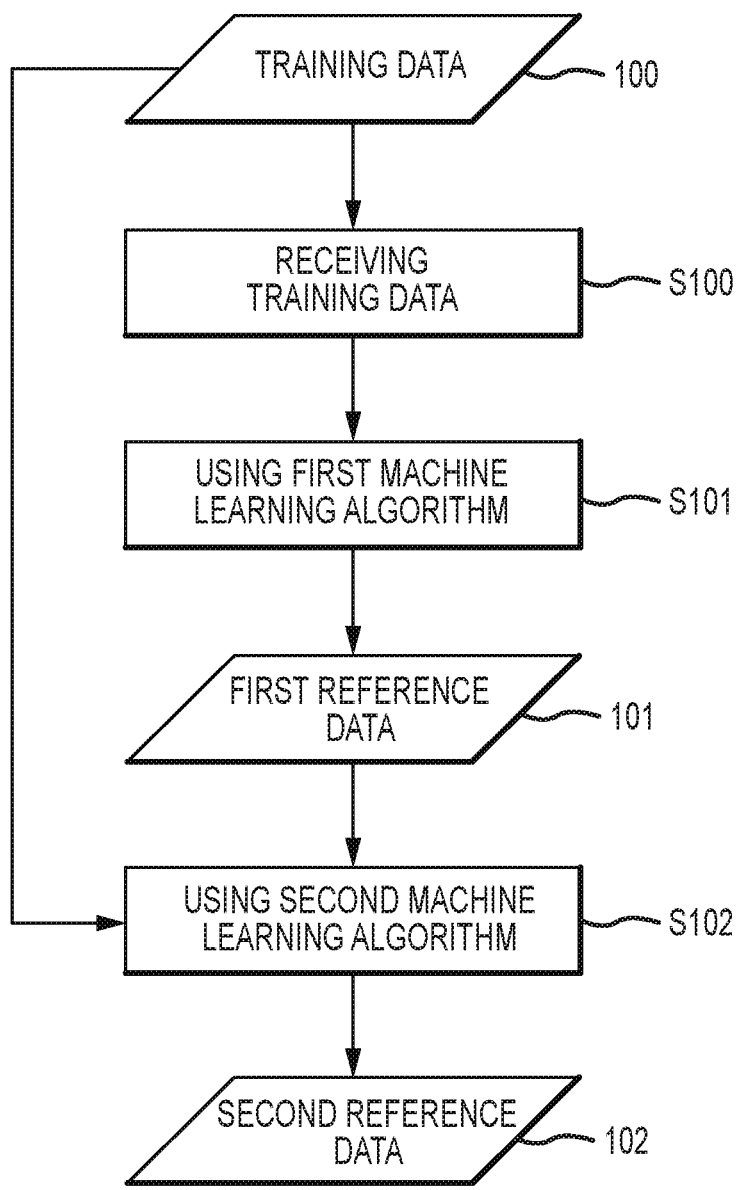
FIG. 8 is flow chart of a method of generating reference data.

FIG. 8 depicts a method of generating reference data (including reference data 37 of the type described in the specific examples discussed above) for adjusting a digital representation of a head region. In some embodiments, the digital representation of the head region comprises or consists of an image of the head region. In some embodiments, the digital representation of the head region comprises or consists of a three-dimensional digital representation (representing, for example, three-dimensional geometrical information). The three-dimensional digital representation may be obtained from depth measurements, using for example a time-of-flight camera. In an embodiment, the digital representation of the head region is usable to provide a computer generated display of the head region. In an embodiment, the adjustment of the digital representation comprises converting a two-dimensional digital representation of the head region to a three-dimensional digital representation of the head region.

In a case where the digital representation of the head region (prior to adjustment, after adjustment, or both) comprises a three-dimensional digital representation, this may be provided in any of various known ways. For example, the three-dimensional digital representation may comprise a point cloud, a particle system, or a mesh representation. The mesh representation may comprise one or more of: a polygonal surface, a multi-resolution surface, a subdivision surface. The digital representation may comprise a three-dimensional digital representation and texture information associated with the three-dimensional digital representation, e.g. via a texture map. The digital representation may comprise a three-dimensional geometrical representation and color information (e.g. obtained from an optical camera) aligned with the three-dimensional geometrical representation. Other volumetric representations such as particle system or implicit definitions such as signed distance functions may also be used.

The method comprises a step S100 of receiving training data 100. The training data 100 may be provided for example via a communications interface 112 (e.g. connecting to an external data connection or storage device) connected to a data processing unit 120 that is to perform the method (as depicted schematically in FIG. 10). The training data 100 comprises a set of input patches. A patch consists of a target portion of a digital representation of a head region. In a case where the digital representation comprises an image, the patch may be referred to as an image patch. Each input patch (e.g. input image patch) comprises a target feature of the digital representation (e.g. image) of the head region prior to adjustment of the digital representation (e.g. adjustment of the image to be displayed) of the head region. The target feature is the same for each input patch. The target feature may comprise one or more of the following: an eye region comprising at least part of an eye (as in the specific examples discussed above with reference to FIG. 4 for example), a nose region comprising at least part of a nose, a mouth region comprising at least part of a mouth, a chin region comprising at least part of a chin, and a neck region comprising at least part of a neck. In an embodiment each input image patch comprises a portion of the image of the head region corresponding to the target feature, such as the above-mentioned eye region, nose region, mouth region, chin region, or neck region.

In an embodiment, the target feature comprises an eye region comprising at least part of an eye and the adjustment of the digital representation (e.g. image) of the head region comprises adjusting a gaze direction.

In an embodiment, the target feature comprises a nose region comprising at least part of a nose and the adjustment of the digital representation (e.g. image) of the head region comprises adjusting a shape and/or texture of the nose (e.g. to make nose look smaller and/or slimmer by a fixed proportion, similar to the effect of a "tele lens").

In an embodiment, the target feature comprises a chin region comprising at least part of a chin and the adjustment of the digital representation (e.g. image) of the head region comprises adjusting a shape and/or texture of the chin (e.g. to reduce or remove double chin appearance).

In an embodiment, the target feature comprises a neck region comprising at least part of a neck and the adjustment of the digital representation (e.g. image) of the head region comprises adjusting a shape and/or texture of the neck (e.g. to reduce or remove wrinkles).

In an embodiment, the target feature comprises a hair region comprising hair and the adjustment of the digital representation (e.g. image) of the head region comprises adjusting a color of the hair (e.g. by a fixed hue).

In the case where the target feature comprises an eye region, the input patches may be obtained using the methodology described above with reference to steps S2-1 and S2-2, except that stereoscopic pairs of images are not necessarily required. Thus, the input patches may be obtained by using identified points ("landmarks") corresponding to features of an eye to locate the relevant region of the digital representation (e.g. image) of the head region (e.g. surrounding the eye) and/or transformation of the input patch into a normalized coordinate system, including alignment of the landmarks with predetermined locations in the normalized coordinate system using translation, rotation and/or scaling.

In some embodiments, the training data 100 further comprises a set of output patches. As described above, each patch consists of a target portion of a digital representation of a head region. In a case where the digital representation comprises an image, the patch may be referred to as an image patch. The output patches (e.g. output images patches) are in one-to-one correspondence with the input patches. Each output patch comprises the target feature of the digital representation (e.g. image) of the head region after adjustment of the digital representation (e.g. adjustment of the image to be displayed) of the head region. Thus, in the case where an image of the head region is to be adjusted to correct a gaze direction, each output patch comprises an eye region that has been adjusted so that the gaze appears to be in the desired direction (e.g. directly towards a destination observer 24).

The method further comprises a step S101 comprising using a first machine learning algorithm to generate first reference data 101 using the training data 100. The first reference data 101 comprises editing instructions (e.g. image editing instructions) for adjusting the digital representation (e.g. image) of the head region for a range of possible digital representations (e.g. digital representations representing different states of the head, such as different positions and/or orientations, optionally represented as different images) of the head region.

The method further comprises a step S102 comprising using a second machine learning algorithm to generate second reference data 102. The second machine learning algorithm uses the same training data 100 as the first machine learning algorithm in step S101. The second machine learning algorithm further uses the first reference data 101 output by the first machine learning algorithm in step S101. The second reference data 102 comprises editing instructions (e.g. image editing instructions) for adjusting the digital representation (e.g. image) of the head region for a range of possible digital representations (e.g. different positions and/or orientations, optionally represented as different images) of the head region.

In an embodiment, the first reference data 101 comprises first editing instructions (e.g. first image editing instructions) for a range of possible configurations of the target feature (e.g. different gaze directions and/or eye morphologies in the case where the target feature comprises an eye region) and first selection instructions for selecting editing instructions (from the first editing instructions) for a particular input patch (e.g. input image patch) based on the configuration of the target feature of the input patch (e.g. the particular gaze direction and/or particular eye morphology of that input patch).

In an embodiment, the second reference data comprises second editing instructions (e.g. second image editing instructions) for a range of possible configurations of the target feature and second selection instructions for selecting editing instructions (from the second editing instructions) for a particular input patch (e.g. input image patch) based on the configuration of the target feature of the input patch.

The configuration of the target feature of each input patch may be represented by a feature vector derived from plural local descriptors (e.g. local image descriptors) of the input patch, as described above with reference to step S3 of FIG. 3 for the particular case where stereoscopic pairs of images containing eye regions are processed (but the method is applicable more generally than this particular case). As described above, the feature vector may take various forms but is generally adapted to be suitable for looking up editing instructions for performing adjustment of the digital representation (e.g. image) of the head region. In the present embodiment, the first and second selection instructions define how the feature vector is used to select editing instructions for the input patch. In an embodiment, the editing instructions comprise a displacement vector field defining how the input patch is to be transformed to perform the adjustment. The displacement vector field may take any of the forms discussed above. The editing instructions are not limited to displacement vector fields, however. Other editing operations may additionally or alternatively be associated with the features vectors to perform other desired adjustments of the digital representation (e.g. image) of the head region, including for example adjustments to pixel colors or intensities, or changes to underlying geometries (e.g. via a filter field, brightness adjustment field, or texture blending field).

In an embodiment, a first editing algorithm (e.g. first image editing algorithm) is used by the first machine learning algorithm to define how the first editing instructions are to be applied to an input patch to derive an output patch. A second editing algorithm (e.g. second image editing algorithm) is used by the second machine learning algorithm to define how the second editing instructions are to be applied to an input patch to derive an output patch. The first and second editing algorithms may comprise any of the methods described above for implemented step S5 of FIG. 3, described with reference to FIGS. 6 and 7.

In an embodiment, the second editing instructions in the second reference data are provided in a compressed representation. The compressed representation may comprise a principle component analysis representation or a wavelet representation for example. In this case, the first and second editing algorithms may be adapted to define how to operate efficiently in this context.

In an embodiment, the second editing instructions are principle component analysis components of a principle component analysis of the first editing instructions. The second editing algorithm in this case transforms the second editing instructions into the first editing instructions by inverse principle component analysis transform.

In an alternative approach, the second editing instructions are wavelet components of the first editing instructions. The second editing algorithm in this case transforms the second editing instructions into the first editing instructions by inverse wavelet transform.

In an embodiment, the first selection instructions for the first reference data are able to select between a larger number of alternative editing instructions (e.g. image editing instructions) than the second selection instructions for the second reference data. The first machine learning algorithm may thus be described as having more input parameters than the second machine learning algorithm. The first machine learning algorithm may provide higher accuracy than the second machine learning algorithm but will typically operate considerably slower. Additionally, the first selection instructions may be significantly more complex (e.g. involving linear algebra or other relatively computer intensive operations) than the second selection instructions (where the selection instructions may resemble a computationally straightforward look-up table, a combination of a look-up table and a tree structure, or similar).

In one particular embodiment, the first machine learning algorithm comprises a neural network (known to provide relatively high accuracy, but at the expense of relatively high computational demands). In such an embodiment, and others, the second machine learning algorithm may comprises a regression forest (known to provide higher computational efficiency, but at the expense of reduced accuracy). The inventors have found that the combination of the two different machine learning algorithms provides reference data that can be used in an adjustment method with high efficiency while still achieving high adjustment accuracy. The first machine learning algorithm may alternatively comprise a support vector machine or a generative adversarial network (GAN). The second machine learning algorithm may alternatively comprise regression ferns, cluster centres, a lookup table, or separable filter banks. In one embodiment, the first machine learning algorithm comprises a first neural network and the second machine learning algorithm comprises a second neural network, wherein the second neural network comprises fewer layers and/or smaller convolution fields than the first neural network.

Figure 9:
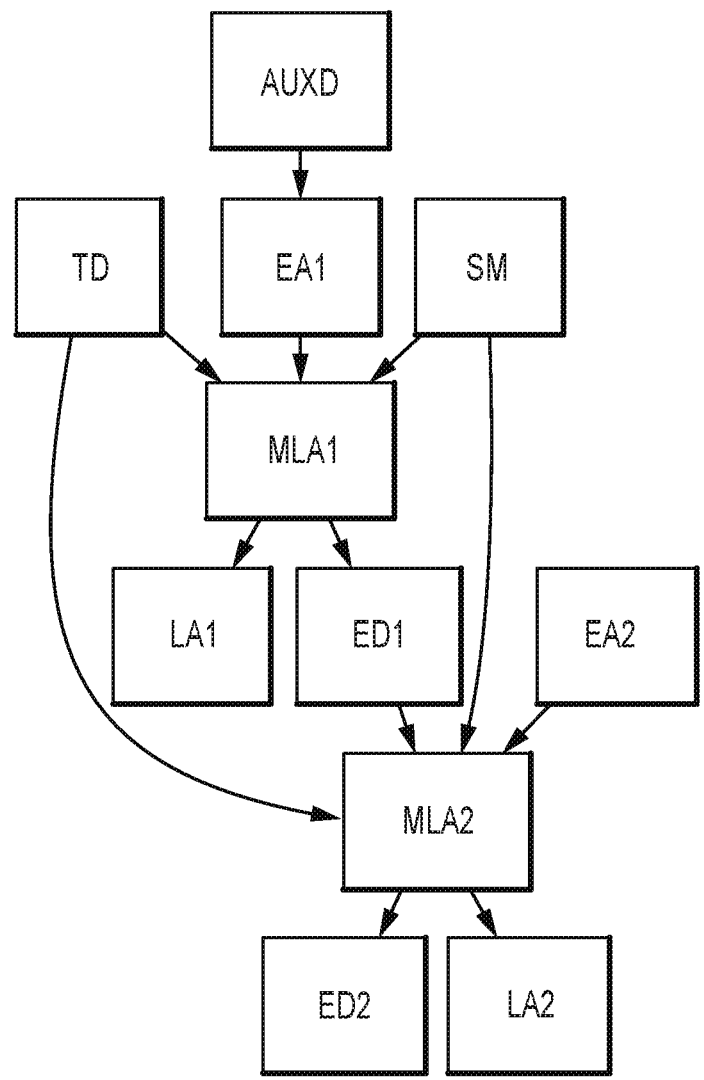
FIG. 9 schematically depicts data flow in an example method of generating reference data.

FIG. 9 schematically depicts data flow in a detailed example of the method of generating reference data of FIG. 8. The first and second machine learning algorithms are respectively labelled MLA1 and MLA2. The first machine learning algorithm MLA1 receives the training data (labelled TD) and, optionally, the first editing algorithm EA1, and a similarity metric SM. The similarity metric SM provides a numerical value to measure similarity between an adjusted image and a desired image and can be used to control the first machine learning algorithm MLA1 and the second machine learning algorithm MLA2 to vary the extent to which differences are penalized according to the nature of the differences. For example, the similarity metric SM may be configured to penalize reductions in portions of images that it is desired to maintain (e.g. sclera in the case where eye regions are being adjusted) or deviations of adjusted features from a known form (e.g. deviations in the shape of an iris from an elliptical form) or from a form that is observed in training data. Alternatively or additionally, the training data may comprise an average absolute or square difference between the adjusted image and a target, or average absolute or square difference between low level representations of the adjusted image and target, such as low level features from a deep learning network (as discussed above). In the example shown, the first editing algorithm EA1 receives auxiliary data AuxD, which defines a basis set used for providing a compressed representation of image editing instructions. The first machine learning algorithm MLA1 outputs first selection instructions LA1 and first editing instructions ED1. The second machine learning algorithm MLA2 receives the same training data TD and, optionally, the second editing algorithm EA2, and the similarity metric SM. The second machine learning algorithm MLA2 additionally receives the first editing instructions ED1. The second machine learning algorithm outputs second selection instructions LA2 and second editing instructions ED2.

The second machine learning algorithm MLA2 thus gets the editing instructions to match or to approximate, and does not have to infer these from the matched input images as MLA1.

Figure 10:
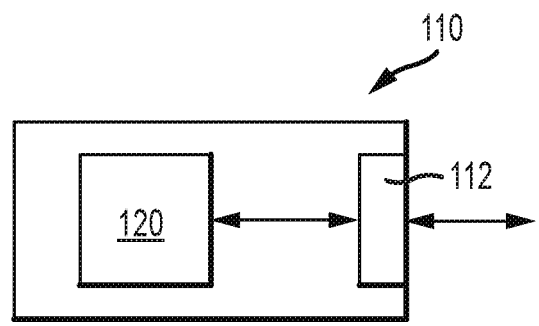
FIG. 10 depicts a device for generating reference data.

FIG. 10 depicts a device 110 for generating the reference data. The device 110 comprises a data processing unit 120 configured to perform the method of generating the reference data according to any of the disclosed embodiments. The data processing unit 110 may be implemented by a processor executing a suitable computer program or by dedicated hardware or by some combination of software and hardware. Data input/output may be provided via a communications interface 112. Where a computer program is used, the computer program may comprise instructions in any suitable language and may be stored on a computer readable storage medium, which may be of any type, for example: a recording medium which is insertable into a drive of the computing system and which may store information magnetically, optically or opto-magnetically; a fixed recording medium of the computer system such as a hard drive; or a computer memory.

Figure 11:
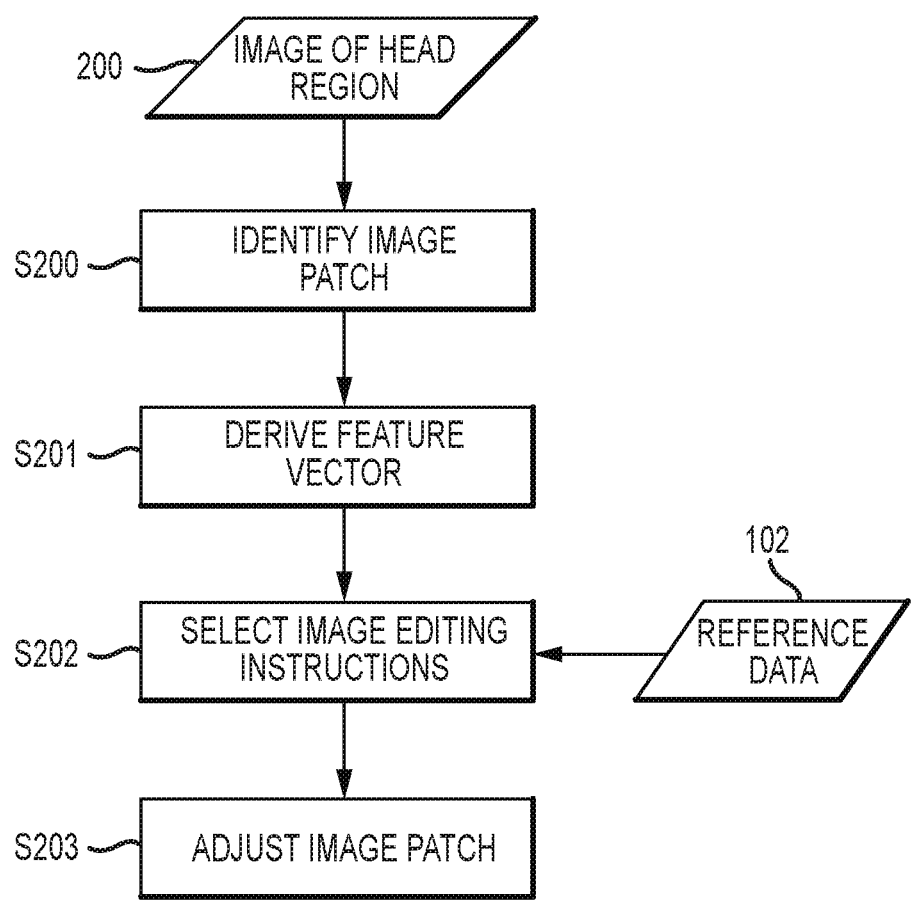
FIG. 11 is a flow chart of a method of adjusting an image of a head region.

FIG. 11 depicts a method of adjusting a digital representation of a head region. In the example shown, the digital representation comprises an image of a head region, but the method can be adapted to use any of the digital representations discussed above (e.g. to additionally or alternatively process three-dimensional digital representations). The method may use reference data generated using any of the methods of generating reference data disclosed herein or may use reference data generated using other methods.

The method comprises a step S200 in which a target patch (in this case an image patch) is identified in an image 200 of a head region that is to be adjusted. The target patch comprises a target feature of the head region. The target feature may take any of the forms discussed above. The step S200 may optionally comprise detecting a head and/or eye location as described above with reference to step S1 of FIG. 3. The step S200 may optionally further comprise identifying image patches using the methodology described above with reference to steps S2-1 and S2-2 of FIG. 5, except that the image patches do not necessarily need to be identified as stereoscopic pairs (although they may be if desired).

In step S201, a feature vector is derived from plural local descriptors (e.g. local image descriptors) of the target (e.g. image) patch. The feature vector may be derived using the methodology described above with reference to step S3 of FIG. 3. The feature vector may take any of the forms discussed above.

In step S202, the feature vector is used to select editing instructions (e.g. image editing instructions) from reference data 102. The reference data 102 comprising editing instructions for a range of possible values of the feature vector (representing for example different gaze directions and/or eye morphologies in the case where the target feature comprises an eye region).

In step S203, the selected editing instructions are applied to the target patch to adjust the image of the head region (e.g. to correct a gaze direction).

In an embodiment, the editing instructions (e.g. image editing instructions) are provided in a compressed representation, comprising for example one or more of the following: a principle component analysis representation; a wavelet representation; Fourier and/or discrete cosine transform components; cluster centers. The use of a compressed representation reduces data storage and bandwidth requirements during use of the image editing instructions to perform adjustment of the digital representation (e.g. image) of the head region. Alternatively or additionally, the reference data containing the editing instructions may be generated using any of the embodiments disclosed herein. The reference data may comprise the second reference data discussed above for example.

Reference to editing instructions herein is understood to encompass any data which can be used to define how a digital representation (e.g. image) of a head region should be adjusted to achieve a desired aim (e.g. gaze correction or conversion from a two-dimensional digital representation to a three-dimensional digital representation or both). The editing instructions may comprise data that can used directly to modify a digital representation (e.g. image), such as a vector field, or intermediate data such as a machine learning parameter set that can be used to generate data that can be used directly to modify the digital representation (e.g. image).

Figure 12:
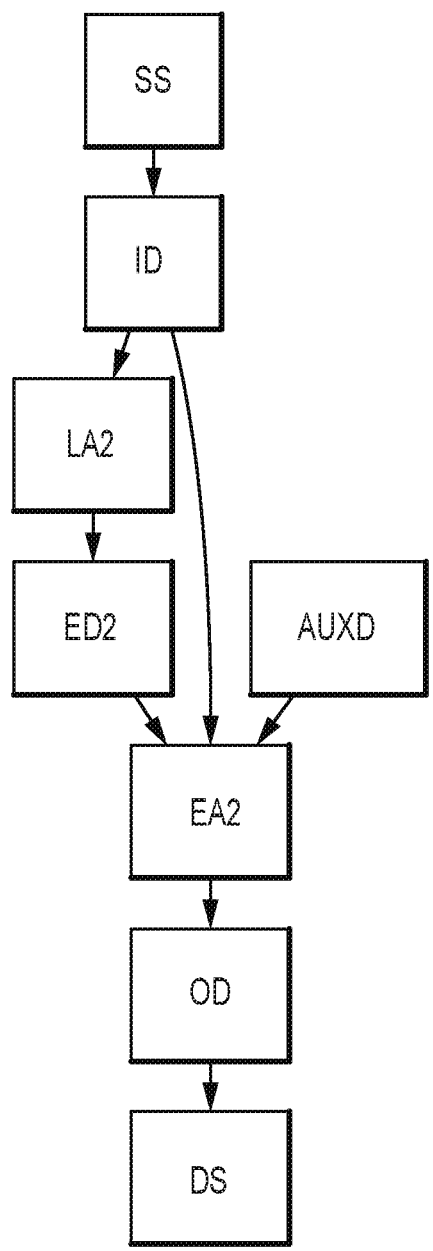
FIG. 12 schematically depicts data flow in an example of a method of adjusting an image of a head region.

FIG. 12 schematically depicts data flow in a detailed example of a method of adjusting a digital representation of a head region in the case where the digital representation comprises an image, using reference data generated according to the detailed example of FIG. 9. Input data ID is provided from a sensor system SS (e.g. comprising one or more cameras). The input data ID is input to the second selection instructions LA2 to select editing instructions appropriate to the input data ID from the second editing instructions ED2. The selected editing instructions, which in this example are provided in a compressed representation (e.g. principle component analysis components or wavelet components) from the compressed second editing instructions ED2, are then used by the second editing algorithm EA2, in combination with the auxiliary data AuxD providing the basis set for the compressed representation, to provide output data OD. The output data OD comprises an adjusted image of the head region and is displayed via a display DS.

Figure 13:
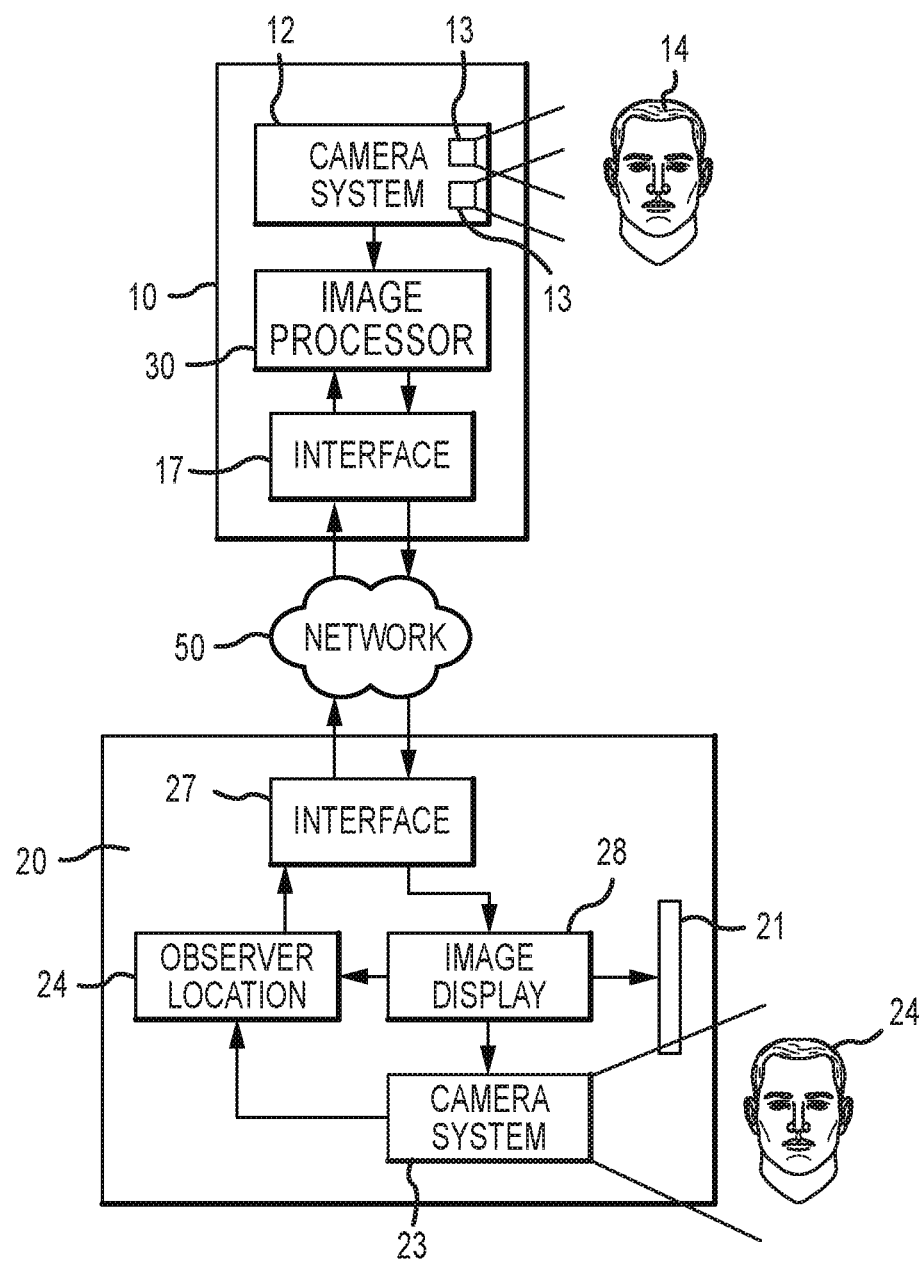
FIG. 13 is a diagram of a telecommunications system in which the method may be implemented.

As described above, the method of adjusting a digital representation of a head region (e.g. an image of a head region) may be implemented in an image processor 30 provided in various different devices. By way of non-limitative example, there will now be described a particular implementation in a telecommunications system which is shown in FIG. 13 and arranged as follows.

In this implementation, the source device 10 and the destination device 10 communicate over such a telecommunications network 50. For communication over the telecommunications network 50, the source device 10 includes a telecommunications interface 17 and the destination device 20 includes a telecommunications interface 27.

In this implementation, the image processor 30 is provided in the source device 10 and is provided with an image of a head region directly from a camera system 12 (in this example, a stereoscopic pair of images). The telecommunications interface 17 is arranged to transmit the adjusted images 38 over the telecommunications network 50 to the destination device 20 for display thereon.

The destination device 20 includes an image display module 28 that controls the display 26. The adjusted images 38 are received in the destination device 20 by the telecommunications interface 27 and supplied to the image display module 28 which causes them to be displayed on the display 26.

The following elements of the destination device 20 are optionally included in the case that the method corrects gaze for a destination observer 24 in an observer location other than a normal viewing position perpendicular to the center of the display location. In this case, the destination device 20 includes a camera system 23 and an observer location module 29. The camera system 23 captures an image of the destination observer 24. The observer location module 29 derives the location data 40. The observer location module 29 includes a head tracking module that uses the output of the camera system 23 to detect the location of the destination observer 24. Where the relative observer location also takes into account the location of the image displayed on the display 21, the observer location module 29 obtains the location of the image displayed on the display 21 from the image display module 28. The telecommunications interface 17 is arranged to transmit the location data 40 over the telecommunications network 50 to the source device 10 for use thereby.

Although the above description refers to a method applied to images supplied from a source device 10 to a destination device 20, the method may equally be applied to images supplied in the opposite direction from the destination device 20 to the source device 10, in which case the destination device 20 effectively becomes the "source device" and the source device 10 effectively becomes the "destination device". Where images are supplied bi-directionally, the labels "source" and "destination" may be applied to both devices, depending on the direction of communication being considered.

Figure 14:
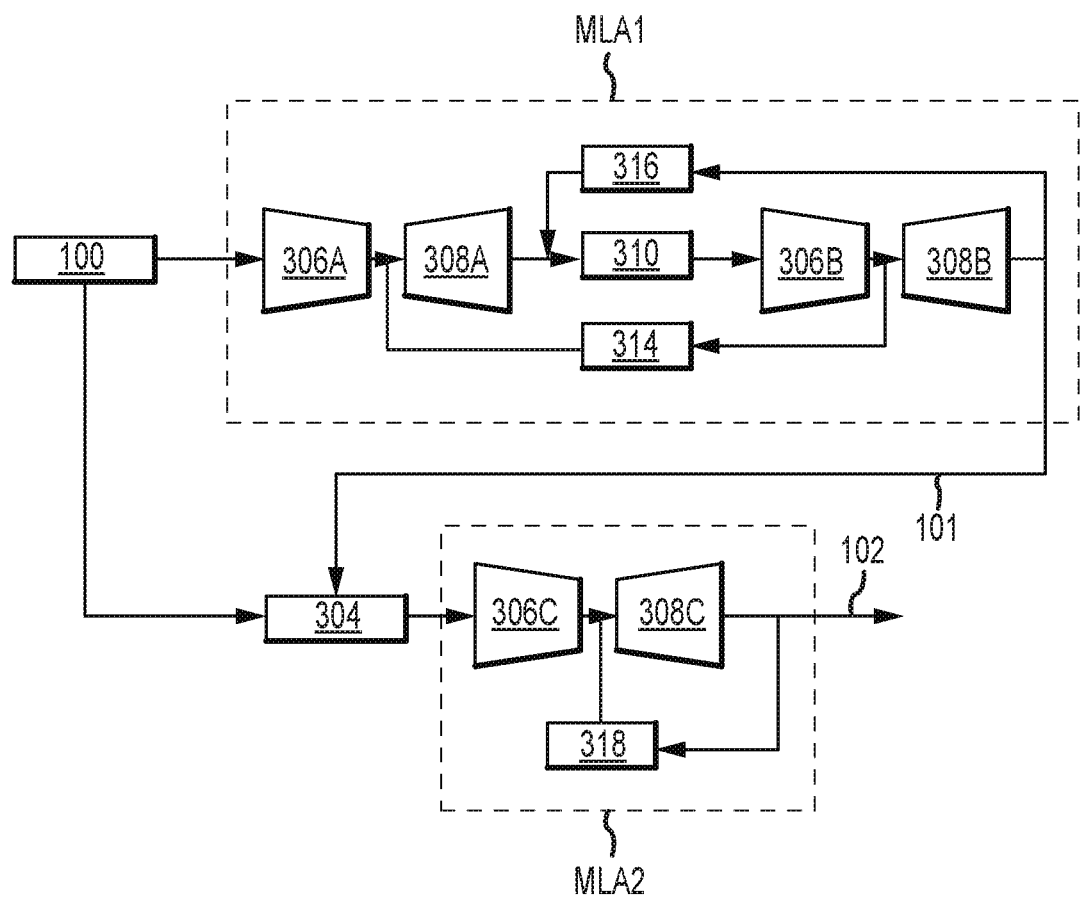
FIG. 14 schematically depicts data flow in an example method of generating reference data for converting a two-dimensional digital representation of a head region to a three-dimensional digital representation of a head region.

FIG. 14 depicts a further embodiment of a method of generating reference data for adjusting a digital representation of a head region using a framework of the type depicted in FIG. 8. In this embodiment, the training data 100 received in step S100 (FIG. 8) comprises a set of input digital representations of a head region (e.g. input patches each consisting of a target portion of a two-dimensional digital representation of the head region, such as a captured image).

In step S101, a first machine learning algorithm MLA1 is trained using the training data 100, the training causing the first machine learning algorithm MLA1 to become capable of performing an adjustment of a digital representation of a head region. In an embodiment, the adjustment of the digital representation comprises converting from a two-dimensional digital representation to a three-dimensional digital representation (e.g. converting from a 2D image of a portion of a head region to a 3D mesh of a portion of the head region). The trained first machine learning algorithm MLA1 is then used to generate first reference data 101. The first reference data 101 comprises an adjusted digital representation of the head region for each of at least a subset of the input digital representations in the training data 100. Each adjusted digital representation is obtained by performing the adjustment that the first machine learning algorithm MLA1 was trained to perform.

In step S102, a second machine learning algorithm MLA2 is trained using at least a subset of the training data 100 used to train the first machine learning algorithm MLA2 and the first reference data 101. The training causes the second machine learning algorithm MLA2 to become capable of performing the same adjustment of a digital representation of a head region as the first machine learning algorithm MLA1.

In the particular embodiment of FIG. 14, the first machine learning algorithm MLA1 comprises a first encoder 306A and a first predictor 308A. The training data 100 is input to the first encoder 306A. In this embodiment, the first encoder 306A comprises a feature extractor algorithm. The feature extractor algorithm derives informative and non-redundant values from the training data 100 (i.e. extracts meaningful features from the training data 100). Examples of feature extractor algorithms include Convolutional Neural Networks, Principal Component Analysis, SIFT (Scale Invariant Feature Transform). An output from the first encoder 306A is input to a first predictor 308A. The first predictor 308A generates an adjusted version of each input digital representation in the training data 100 based on the output of the first encoder 306A (e.g. features extracted by the first encoder 306A). In this embodiment, each input digital representation comprises a two-dimensional digital representation (e.g. a two-dimensional image) and the adjusted version of each input digital representation comprises a three-dimensional digital representation (e.g. a mesh). Each three-dimensional digital representation is input to a renderer 310. The renderer 310 synthesizes one or more two-dimensional digital representations corresponding to each input three-dimensional digital representation (e.g. one or more photorealistic images of the head region defined by the three-dimensional digital representation). The output from the renderer 310 is then input to a second encoder 306B. The second encoder 306B may be identical to the first encoder 306A. An output from the second encoder 306B is input to a second predictor 308B. The second predictor 308B may be identical to the first predictor 308A. A first regularizer 314 is provided that compares the output from the first encoder 306A with the output from the second encoder 306B and imposes one or more predetermined first constraints. A second regularizer 316 is provided that compares the output from the first predictor 308A with the output from the second predictor 308B and imposes one or more predetermined second constraints. The first regularizer 314 and the second regularizer 316 may use a set of semantically meaningful constraints (examples of the first constraints and second constraints) or additional information to help reach a desirable solution and to prevent overfitting. The constraints may help to ensure that generated three-dimensional digital representations are natural looking for example, by requiring high levels of natural levels of smoothness. Using this architecture, the first machine learning algorithm MLA1 iteratively updates properties of the first predictor 308A and the second predictor 308B (e.g. by adjusting parameters such as weights defining the operation of the predictor) to maximize matching between the outputs from the first and second encoders (as measured by the first regularizer 314) subject to the first constraints and to maximize matching between the outputs from the first and second predictors (as measured by the second regularizer 316) subject to the second constraints. In other embodiments, the first encoder 306A and second encoder 306B may also be iteratively updated. The training of the first machine learning algorithm MLA1 thus comprises iteratively using a rendering process to generate a two-dimensional digital representation from a three-dimensional digital representation generated by the first machine learning algorithm MLA1 and comparing the generated digital representation with a corresponding digital representation in the training data. Once matching has been achieved or a predetermined number of iterations have been performed, the first machine learning algorithm MLA1 is considered trained and the resulting output from the second predictor 308B can be used to provide the first reference data 101 (which in this embodiment comprises three-dimensional digital representations corresponding to the input two-dimensional representations in the training data 100).

As an extension, new two-dimensional and/or three-dimensional digital representations can be generated by applying editing instructions either to two-dimensional digital representations (which are converted to three-dimensional digital representations by the trained first machine learning algorithm MLA1) or to three-dimensional digital representations output by the trained first machine learning algorithm MLA1). In this case, the first reference data 101 may include the two-dimensional digital representations and/or three-dimensional representations after modification by the editing instructions.

A set of thus generated three-dimensional digital representations output as first reference data 101 and corresponding two-dimensional digital representations (e.g. directly from the training data 100 as shown in FIG. 14) are used to train the second machine learning algorithm MLA2 (input at block 304). In this embodiment, the second machine learning algorithm MLA2 also comprises an encoder 306C and a predictor 308C, which may be configured as described above for the first machine learning algorithm MLA1. The predictor 308C (and, optionally, the encoder 308C) may be iteratively updated (trained) using a regularizer 318 based on the input training data 100 and first reference data 101. Thus, the second machine learning algorithm MLA2 learns to convert between a two-dimensional digital representation and a three-dimensional digital representation based on the mapping between two-dimensional digital representations and three-dimensional digital representations derived using the renderer 310 in the first machine learning algorithm MLA1. Provided the mapping derived by the first machine learning algorithm MLA1 is reliable, the second machine learning algorithm MLA2 will be able to provide accurate conversion between two-dimensional digital representations and three-dimensional digital representations using a simpler trained machine learning model (which can be stored and operated using fewer computing resources than the first machine learning algorithm MLA1).

Figure 15:
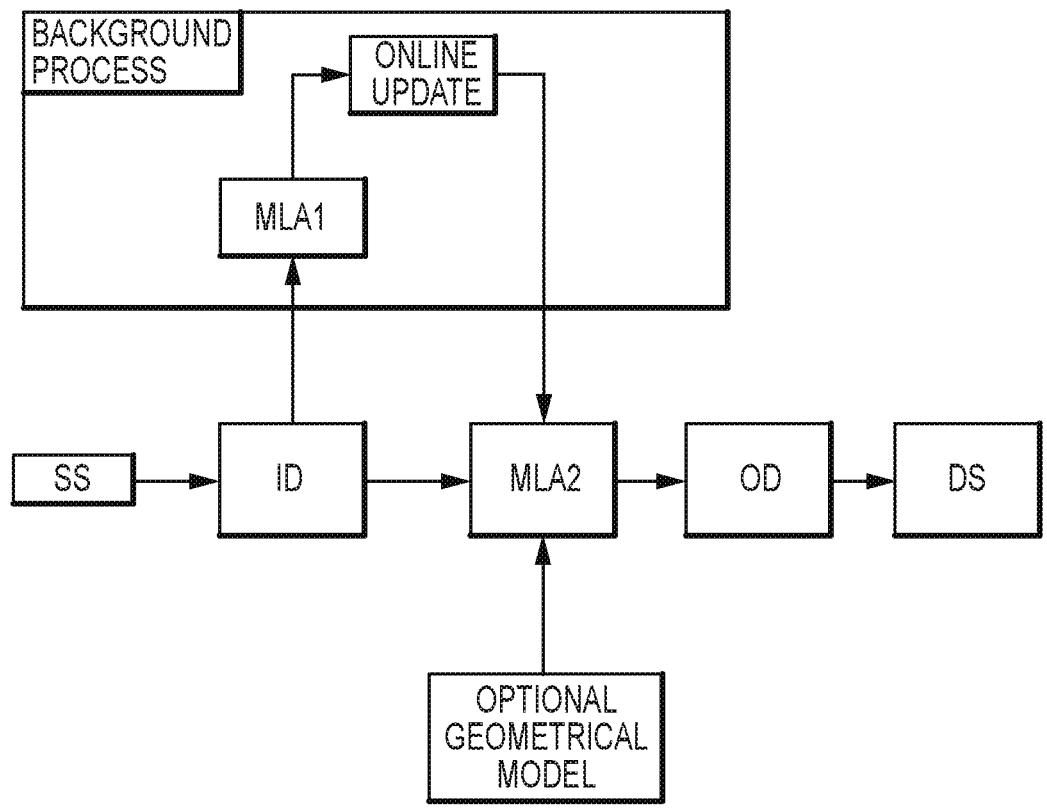
FIG. 15 schematically depicts data flow in an example of a method of adjusting a digital representation of a head region in which a second machine learning algorithm is updated online.

FIG. 15 depicts data flow in an example implementation of an embodiment in which a pre-trained second machine learning algorithm MLA2 is updated (i.e. trained further) in at or near input data frame rate (i.e. online). In embodiments of this type, a plurality of the digital representations (e.g. images) of the head region may be received as input data ID (e.g. from a sensor system SS as described above) and adjusted (e.g. as described above with reference to FIGS. 11, 12 and 14) to provide output data OD that is subsequently displayed via display DS (as described above with reference to FIG. 12). The input data ID may comprise a set of input patches, each input patch comprising a target feature of a digital representation of a head region prior to adjustment of the digital representation of the head region, wherein the target feature is the same for each input patch. The adjustment may be performed using a pre-trained version of the second machine learning algorithm MLA2, optionally in combination with a geometrical model. The input data ID may comprise digital representations captured at different points in times, such as different frames in a sequence of images obtained by the sensor system SS in a video capture mode. In an embodiment, the method comprises updating the pre-trained second machine learning algorithm MLA2 using first reference data (e.g. editing instructions) generated by the first machine learning algorithm MLA1 using one or more of the received digital representations (from the input data ID). The first reference data may comprise a set of editing instructions in one-to-one correspondence with the input patches, each editing instruction being for adjusting the digital representation of the head region. In the example depicted in FIG. 15, the first reference data for the updating is generated in a background process and the second machine learning algorithm MLA2 is updated at or near input data frame rate (i.e. online).

The updating thus uses a pre-trained version of the first machine learning algorithm MLA1 (which, as described above, is configured to provide more highly detailed reference data at the expense of higher computational demands, relative to the second machine learning algorithm MLA2) to generate first reference data that is used to update the second machine learning algorithm MLA2. Where the first machine learning algorithm MLA1 is slower than the second machine learning algorithm MLA2 (which will normally be the case where the first machine learning algorithm MLA1 is configured to provide more highly detailed reference data than the second machine learning algorithm MLA2), only a subset of the input data ID (comprising the received and adjusted digital representations) are used to update the second machine learning algorithm MLA2, thereby allowing the updating process to keep up with the adjusting of the input data ID by the second machine learning algorithm MLA2 to provide the output data OD. Any of various known techniques may be used to perform the updating of the second machine learning algorithm MLA2. For example, the online updating may be performed as described in Amir Saffari, Christian Leistner, Jakob Santner, Martin Godec, and Horst Bischof, "On-line Random Forests," in 3rd IEEE ICCV Workshop on On-line Computer Vision, 2009, which is herein incorporated by reference in its entirety, or as described in Online Deep Learning: Learning Deep Neural Networks on the Fly, Doyen Sahoo, Quang Pham, Jing Lu, Steven C. H., Hoi School of Information Systems, Singapore Management University (https://arxiv.org/pdf/1711.03705.pdf), which is herein incorporated by reference in its entirety. The second machine learning algorithm MLA2 can therefore be gradually improved during use, as more input data ID are encountered and processed by the system.

Additional embodiments of the disclosure are described in the following numbered clauses.

1. A method of generating reference data for adjusting an image of a head region, the method comprising:
 receiving training data comprising:
  a set of input image patches, each input image patch comprising a target feature of an image of a head region prior to adjustment of the image of the head region, wherein the target feature is the same for each input image patch; and a set of output image patches in one-to-one correspondence with the input image patches, each output image patch comprising the target feature of the image of the head region after adjustment of the image of the head region;

using a first machine learning algorithm to generate first reference data using the training data, the first reference data comprising image editing instructions for adjusting the image of the head region for a range of possible images of the head region; and using a second machine learning algorithm to generate second reference data using the same training data as the first machine learning algorithm and the first reference data generated by the first machine learning algorithm, the second reference data comprising image editing instructions for adjusting the image of the head region for a range of possible images of the head region.

2. The method of clause 1, wherein:

the first reference data comprise first image editing instructions for a range of possible configurations of the target feature and first selection instructions for selecting image editing instructions for a particular input image patch from the first image editing instructions based on the configuration of the target feature of the input image patch; and the second reference data comprise second image editing instructions for a range of possible configurations of the target feature and second selection instructions for selecting image editing instructions for a particular input image patch from the second image editing instructions based on the configuration of the target feature of the input image patch.

3. The method of clause 2, wherein the configuration of the target feature of each input image patch is represented by a feature vector derived from plural local image descriptors of the input image patch, and the first and second selection instructions define how the feature vector is used to select image editing instructions for the input image patch.

4. The method of clause 2 or 3, wherein the image editing instructions comprise a displacement vector field defining how the input image patch is to be transformed.

5. The method of clause 2 or 3, wherein the image editing instructions comprise a filter field, a brightness adjustment field, or a texture blending field.

6. The method of any of clauses 2-5, wherein:

a first image editing algorithm is used by the first machine learning algorithm to define how the first image editing instructions are to be applied to an input image patch to derive an output image patch; and a second image editing algorithm is used by the second machine learning algorithm to define how the second image editing instructions are to be applied to an input image patch to derive an output image patch.

7. The method of clause 6, wherein:

the second image editing instructions are principle component analysis components of a principle component analysis of the first image editing instructions; and the second image editing algorithm is configured to transform the second image editing instructions into the first image editing instructions by inverse principle component analysis transform.

8. The method of clause 6, wherein:

the second image editing instructions are wavelet components of the first image editing instructions; and the second image editing algorithm is configured to transform the second image editing instructions into the first image editing instructions by inverse wavelet transform.

9. The method of any of clauses 2-8, wherein the first selection instructions for the first reference data are able to select between a larger number of alternative image editing instructions than the second selection instructions for the second reference data.

10. The method of any preceding clause, wherein the first machine learning algorithm is of a different machine learning algorithm type than the second machine learning algorithm.

11. The method of any preceding clause, wherein the first machine learning algorithm comprises one or more of the following: a neural network; a support vector machine; a generative adversarial network, GAN.

12. The method of any preceding clause, wherein the second machine learning algorithm comprises one or more of the following: a regression forest; regression ferns, cluster centres, a lookup table, separable filter banks.

13. The method of any of clauses 1-10, wherein the first machine learning algorithm comprises a first neural network and the second machine learning algorithm comprises a second neural network, wherein the second neural network comprises fewer layers and/or smaller convolution fields than the first neural network.

14. The method of any preceding clause, wherein the target feature comprises one or more of the following: an eye region comprising at least part of an eye, a nose region comprising at least part of a nose, a mouth region comprising at least part of a mouth, a chin region comprising at least part of a chin, a neck region comprising at least part of a neck, and a hair region comprising hair.

15. The method of any of clauses 1-13, wherein:

the target feature comprises an eye region comprising at least part of an eye and the adjustment of the image of the head region comprises adjusting a gaze direction;

the target feature comprises a nose region comprising at least part of a nose and the adjustment of the image of the head region comprises adjusting a shape and/or texture of the nose;

the target feature comprises a chin region comprising at least part of a chin and the adjustment of the image of the head region comprises adjusting a shape and/or texture of the chin;

the target feature comprises a neck region comprising at least part of a neck and the adjustment of the image of the head region comprises adjusting a shape and/or texture of the neck; and/or the target feature comprises a hair region comprising hair and the adjustment of the image of the head region comprises adjusting a color of the hair.

16. The method of any preceding clause, wherein the second image editing instructions in the second reference data are provided in a compressed representation.

17. The method of clause 16, wherein the compressed representation comprises one or more of the following: a principle component analysis representation; a wavelet representation; Fourier and/or discrete cosine transform components; cluster centres.

18. A method of adjusting an image of a head region, the method comprising:

identifying an image patch in the image of the head region, the image patch comprising a target feature of the image of the head region;

deriving a feature vector from plural local image descriptors of the image patch;

using the feature vector to select image editing instructions from reference data, the reference data comprising image editing instructions for a range of possible values of the feature vector; and applying the selected image editing instructions to the image patch to adjust the image of the head region, wherein:

the reference data comprises the second reference data generated by the method of any of clauses 1-17.

19. A method of adjusting an image of a head region, the method comprising:

identifying an image patch in the image of the head region, the image patch comprising a target feature of the image of the head region;

deriving a feature vector from plural local image descriptors of the image patch;

using the feature vector to select image editing instructions from reference data, the reference data comprising image editing instructions for a range of possible values of the feature vector; and applying the selected image editing instructions to the image patch to adjust the image of the head region, wherein:

the image editing instructions in the reference data are provided in a compressed representation.

20. The method of clause 19, wherein the compressed representation comprises one or more of the following: a principle component analysis representation; a wavelet representation; Fourier and/or discrete cosine transform components; cluster centres.

21. A computer program capable of execution by a processor and arranged on execution to cause the processor to perform a method according to any of the preceding clauses.

22. A computer readable storage medium storing a computer program according to clause 21.

23. A device for generating reference data for adjusting an image of a head region, the device comprising a data processing unit arranged to:

receive training data comprising:
a set of input image patches, each input image patch comprising information about a target feature of an image of the head region prior to adjustment of the image of the head region, wherein the target feature is the same for each input image patch; and
a set of output image patches in one-to-one correspondence with the input image patches, each output image patch comprising the target portion of the image of the head region after adjustment of the image of the head region;

use a first machine learning algorithm to generate first reference data using the training data; and use a second machine learning algorithm to generate second reference data using the same training data as the first machine learning algorithm and the first reference data output by the first machine learning algorithm.

24. A device for adjusting an image of a head region, the device comprising an image processor arranged to process the image of the head region by:

identifying an image patch in the image of the head region, the image patch comprising information about a target feature of the image of the head region;

deriving a feature vector from plural local image descriptors of the image patch;

using the feature vector to select image editing instructions from reference data, the reference data comprising image editing instructions for a range of possible values of the feature vector; and applying the selected image editing instructions to the image patch to adjust the image of the head region, wherein:

the image editing instructions in the reference data are provided in a compressed representation.

25. The device of clause 24, further comprising a telecommunications interface arranged to transmit the adjusted image over a telecommunications network to a destination device for display thereon.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method of adjusting a digital representation of a head region, the method comprising:
   identifying a target patch in the digital representation of the head region, the target patch comprising a target feature of the digital representation of the head region;
   deriving a feature vector from plural local descriptors of the target patch;
   using the feature vector to select editing instructions from reference data, the reference data comprising editing instructions for a range of possible values of the feature vector;
   applying the selected editing instructions to the target patch to adjust the digital representation of the head region, wherein a plurality of the digital representations of the head region are received and adjusted; and
   updating a second machine learning algorithm using editing instructions generated by a first machine learning algorithm using one or more of the received and adjusted digital representations.

2. The method of claim 1, wherein each digital representation is captured from the head region at a different point in time.

3. The method of claim 1, wherein the updating of the second machine learning algorithm is performed at or near input data frame rate.

4. The method of claim 3, wherein a subset of the received and adjusted digital representations are used to update the second machine learning algorithm.

5. The method of claim 1, further comprising receiving image information of the head region from a sensing system.

6. The method of claim 5, wherein the sensing system comprises a visual camera adapted to receive light in the visible electromagnetic spectrum.

7. The method of claim 6, wherein the sensing system comprises a depth sensor offset from the visual camera by a predetermined distance, the depth sensor adapted to make depth measurements of the head region.

8. The method of claim 5, wherein the image information comprises depth information of the head region.

9. The method of claim 1, wherein the sensing system is a camera system.

10. The method of claim 1, wherein the editing instructions in the reference data are provided in a compressed representation.

11. The method of claim 10, wherein the compressed representation comprises one or more of the following: a principle component analysis representation; a wavelet representation; Fourier and/or discrete cosine transform components; and cluster centers.

12. A device for adjusting a digital representation of a head region, the device comprising:
 a sensing system arranged to receive a digital representation of a head region; and
 a data processing unit communicatively coupled to the sensing system and arranged to process the digital representation of the head region by:
 identifying a target patch in the digital representation of the head region, the target patch comprising information about a target feature of the digital representation of the head region;
 deriving a feature vector from plural local descriptors of the target patch;
 using the feature vector to select editing instructions from reference data, the reference data comprising editing instructions for a range of possible values of the feature vector;
 applying the selected editing instructions to the target patch to adjust the digital representation of the head region, wherein a plurality of the digital representations of the head region are received and adjusted; and
 updating a second machine learning algorithm using editing instructions generated by a first machine learning algorithm using one or more of the received and adjusted digital representations.

13. The device of claim 12, wherein each digital representation is captured from the head region at a different point in time.

14. The device of claim 12, wherein the first machine learning algorithm comprises a first neural network and the second machine learning algorithm comprises a second neural network, wherein the second neural network comprises fewer layers and/or smaller convolution fields than the first neural network.

15. The device of claim 12, wherein the updating of the second machine learning algorithm is performed at or near input data frame rate.

16. The device of claim 12, wherein a subset of the received and adjusted digital representations are used to update the second machine learning algorithm.

17. The device of claim 12, wherein the sensing system comprises a camera system.

18. The device of claim 17, wherein the camera system comprises first and second cameras facing the head region and offset from each other by a predetermined distance.

19. The device of claim 18, wherein the first and second cameras have different fields of view.

20. The device of claim 18, wherein the first and second cameras have different sensing modalities from each other.

21. The device of claim 18, wherein the first and second cameras have sensing modalities are selected from the group comprising visible light, infrared light, depth, and time-of-flight.

22. The device of claim 12, further comprising a display, wherein the sensing system is located adjacent to the display.

23. The device of claim 12, further comprising a display, wherein the sensing system is located offset from the display.

24. The device of claim 12, further comprising a display, wherein the sensing system is located above the display.

25. The device of claim 12, wherein the sensing system comprises a visual camera comprising a sensor to receive light in the visible electromagnetic spectrum.

26. The device of claim 25, wherein the sensing system further comprises a depth sensor offset from the visual camera, the depth sensor adapted to make depth measurements of a head region.

27. The device of claim 12, wherein the editing instructions in the reference data are provided in a compressed representation.

28. The device of claim 27, wherein the compressed representation comprises one or more of the following: a principle component analysis representation; a wavelet representation; Fourier and/or discrete cosine transform components; and cluster centers.

* * * * *